US008656276B2

(12) United States Patent
Tanaka

(10) Patent No.: US 8,656,276 B2
(45) Date of Patent: Feb. 18, 2014

(54) POSITION INFORMATION MANAGEMENT SYSTEM, IMAGE FORMING APPARATUS, POSITION INFORMATION MANAGEMENT METHOD AND STORAGE MEDIUM

(75) Inventor: Kei Tanaka, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1239 days.

(21) Appl. No.: 11/333,225

(22) Filed: Jan. 18, 2006

(65) Prior Publication Data

US 2007/0041051 A1 Feb. 22, 2007

(30) Foreign Application Priority Data

Jul. 12, 2005 (JP) .............................. P 2005-203452

(51) Int. Cl.
G06K 15/00 (2006.01)

(52) U.S. Cl.
USPC ............................. 715/236; 715/237; 715/261

(58) Field of Classification Search
USPC .................. 358/1.18; 715/236, 237, 263, 261
See application file for complete search history.

(56) References Cited

U.S. PATENT DOCUMENTS

| 4,928,252 | A | * | 5/1990 | Gabbe et al. | 358/1.2 |
| 5,631,983 | A | * | 5/1997 | Ohnishi et al. | 382/284 |
| 5,768,488 | A | * | 6/1998 | Stone et al. | 358/1.18 |
| 6,301,013 | B1 | * | 10/2001 | Momose et al. | 358/1.15 |
| 6,417,931 | B2 | * | 7/2002 | Mori et al. | 358/1.15 |
| 6,631,007 | B1 | * | 10/2003 | Buis et al. | 358/1.13 |
| 6,880,124 | B1 | * | 4/2005 | Moore | 715/210 |
| 6,963,412 | B1 | * | 11/2005 | Toda | 358/1.13 |
| 7,099,037 | B2 | * | 8/2006 | Clark et al. | 358/1.18 |
| 7,154,627 | B2 | * | 12/2006 | Nishikawa et al. | 358/1.15 |
| 7,212,309 | B1 | * | 5/2007 | Sellers et al. | 358/1.2 |
| 7,606,823 | B2 | * | 10/2009 | Kusakabe et al. | 1/1 |
| 7,791,755 | B2 | * | 9/2010 | Mori | 358/1.18 |
| 2001/0031150 | A1 | * | 10/2001 | Shimada et al. | 399/82 |
| 2002/0070281 | A1 | | 6/2002 | Nimura et al. | 235/494 |
| 2002/0080405 | A1 | * | 6/2002 | Kuroda | 358/1.18 |
| 2003/0011802 | A1 | * | 1/2003 | Nakagiri et al. | 358/1.13 |
| 2003/0098983 | A1 | | 5/2003 | Terada | 358/1.2 |
| 2003/0106019 | A1 | * | 6/2003 | Silverbrook et al. | 715/512 |
| 2004/0012811 | A1 | * | 1/2004 | Nakayama | 358/1.15 |
| 2004/0211330 | A1 | * | 10/2004 | Clark et al. | 101/483 |
| 2005/0008387 | A1 | * | 1/2005 | Sato | 399/81 |
| 2005/0168764 | A1 | * | 8/2005 | Yamamura | 358/1.13 |
| 2005/0190405 | A1 | * | 9/2005 | Tomita | 358/1.18 |
| 2005/0219616 | A1 | * | 10/2005 | Furuta et al. | 358/1.18 |

(Continued)

FOREIGN PATENT DOCUMENTS

JP 7-256975 A 10/1995
JP 2002-240387 A 8/2002

(Continued)

Primary Examiner — Stephen Hong
Assistant Examiner — Marshon Robinson
(74) Attorney, Agent, or Firm — Sughrue Mion, PLLC

(57) ABSTRACT

A position information management system, an image forming apparatus, a position information management method and a storage medium is provided. The position information management system includes a document acquisition unit that acquires an electronic document to be printed; a layout acquisition unit that acquires layout information for printing the electronic document on a medium in a layout different from a layout for ordinary printing; and an information generation unit that generates correspondent information between a position on the electronic document and a position on the medium in the case where the electronic document is printed on the medium on the basis of the layout information.

16 Claims, 16 Drawing Sheets

(56) References Cited

U.S. PATENT DOCUMENTS

| | | |
|---|---|---|
| 2006/0152758 A1* | 7/2006 | Owen ............................ 358/1.15 |
| 2006/0271548 A1* | 11/2006 | Maes .............................. 707/10 |
| 2008/0079973 A1* | 4/2008 | Beus et al. ................... 358/1.13 |
| 2009/0292672 A1* | 11/2009 | Kunjithapatham et al. ........ 707/3 |

FOREIGN PATENT DOCUMENTS

| | | |
|---|---|---|
| JP | 2003-163801 A | 6/2003 |
| JP | 2004-094907 | 3/2004 |
| JP | 2004-102707 | 4/2004 |

* cited by examiner

FIG. 5

| N-up | P mod N | ADDRESS | ROTATIONAL ANGLE |
|---|---|---|---|
| 1-up | 0 | ((x10, y10), (x11, y11)) | 0 |
| 2-up | 0 | ((x20, y20), (x21, y21)) | 90 |
|  | 1 | ((x22, y22), (x23, y23)) | 90 |
| 4-up | 0 | ((x30, y30), (x31, y31)) | 0 |
|  | 1 | ((x32, y32), (x33, y33)) | 0 |
|  | 2 | ((x34, y34), (x35, y35)) | 0 |
|  | 3 | ((x36, y36), (x37, y37)) | 0 |
| ⋮ | ⋮ | ⋮ | ⋮ |

FIG. 6

| MEDIUM ID | MEDIUM ADDRESS | DOCUMENT ID | DOCUMENT ADDRESS | ROTATIONAL ANGLE |
|---|---|---|---|---|
| ID1 | ((x20, y20), (x21, y21)) | Doc1#1 | ((x10, y10), (x11, y11)) | 90 |
| ID1 | ((x22, y22), (x23, y23)) | Doc1#2 | ((x10, y10), (x11, y11)) | 90 |
| ⋮ | ⋮ | ⋮ | ⋮ | ⋮ |

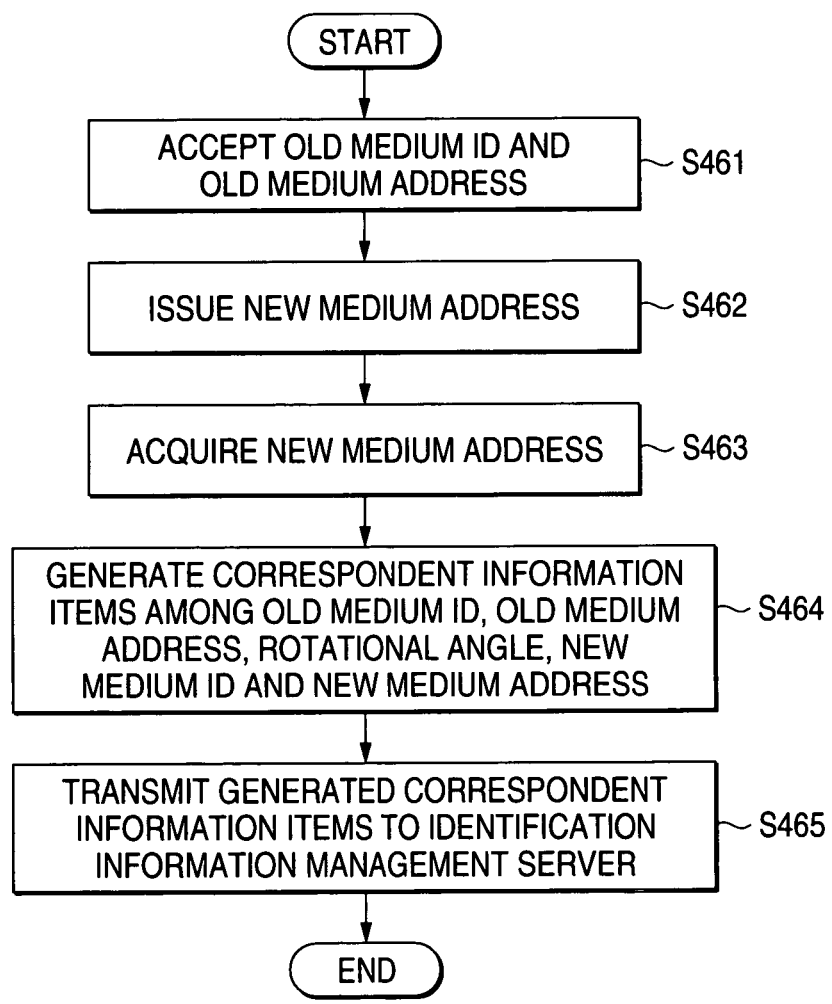

FIG. 16A

| OLD MEDIUM ID | OLD MEDIUM ADDRESS | ROTATIONAL ANGLE | NEW MEDIUM ID | NEW MEDIUM ADDRESS |
|---|---|---|---|---|
| ID3 | ((x30, y30), (x31, y31)) | 0 | ID5 | ((x50, y50), (x51, y51)) |
| ID4 | ((x40, y40), (x41, y41)) | 0 | ID5 | ((x52, y52), (x53, y53)) |
| ID4 | ((x42, y42), (x43, y43)) | 0 | ID5 | ((x54, y54), (x55, y55)) |
| ⋮ | ⋮ | ⋮ | ⋮ | ⋮ |

FIG. 16B

| MEDIUM ID | MEDIUM ADDRESS | DOCUMENT ID | DOCUMENT ADDRESS | ROTATIONAL ANGLE |
|---|---|---|---|---|
| ID5 | ((x50, y50), (x51, y51)) | Doc3#1 | ((x30, y30), (x31, y31)) | 0 |
| ID5 | ((x52, y52), (x53, y53)) | Doc4#1 | ((x40, y40), (x41, y41)) | 0 |
| ID5 | ((x54, y54), (x55, y55)) | Doc4#1 | ((x42, y42), (x43, y43)) | 0 |
| ⋮ | ⋮ | ⋮ | ⋮ | ⋮ |

POSITION INFORMATION MANAGEMENT SYSTEM, IMAGE FORMING APPARATUS, POSITION INFORMATION MANAGEMENT METHOD AND STORAGE MEDIUM

CROSS-REFERENCE TO RELATED APPLICATIONS

This application claims the benefit of priority under 35 U.S.C. §119(a) to Japanese Application No. 2005-203452, filed on Jul. 12, 2005, the invention of which is incorporated by reference herein in its entirety.

BACKGROUND OF THE INVENTION

1. Field of the Invention

The present invention relates to an image forming apparatus such as copying machine or printer, a position information management system which manages a position on a medium for use in the image forming apparatus, and so forth.

2. Description of the Related Art

In recent years, notice is taken of a technique with which a user writes a character or depicts a picture on a special sheet of paper printed with fine dots, and he/she transfers the data of, e.g., the character written on the sheet of paper, to a personal computer, a portable telephone or the like, whereby the content can be saved or transmitted by mail. With the technique, the small dots are printed on the special sheet of paper at intervals of, for example, about 0.3 mm, and they are formed so as to depict different patterns in all individual grids of predetermined size by way of example. The position of, e.g., the character written on the special sheet of paper can be specified by reading the dots with, for example, a dedicated pen which has a built-in digital camera, so that the character or the like can be utilized as electronic information.

Here, a related-art technique is one wherein an electronic document, and a sheet of paper printed with the electronic document are associated beforehand, and a character or the like written on the sheet of paper, and the electronic document are merged. Concretely, the identification information of the page of the electronic document, and position information on the sheet of paper are embedded in a code image represented by, for example, a two-dimensional code capable of machine reading, and they are printed in superposition on the electronic document by a printer or the like. Subsequently, using a scanner of pen type, a handwritten operation on a printed document and the partial image of a handwritten location are successively acquired from the printed document. Besides, the identification information of the page of the electronic document and the plurality of position information items of the partial image on the printed document are detected by analyzing the acquired image. Thereafter, the page of the original electronic document is identified using the detected identification information, and contents handwritten on the printed document are reproduced using the plurality of position information items, whereby the handwritten contents can be added to the page of the original electronic document.

Besides, another related-art technique is one wherein a fixed form is printed on a sheet of Anoto paper, and an item within the fixed form is designated, whereby detailed information on the item can be referred to. Concretely, information for identifying the item on the sheet of paper, and the detailed information of the item are managed in association beforehand, and the detailed information on the item which a user has read by a reading device is transmitted to a user terminal.

Meanwhile, when printing an electronic document on a medium such as paper, various print conditions are designated. Among them, there is a print condition concerning layout. By way of example, scale-down or N-up (printing in which N pages of the electronic document are allocated within one page of the sheet of paper) is performed in order to save the medium. Also, scale-up is selected in order that a character or the like printed on the medium may become legible.

Such a print layout, however, is not considered in the related art described above. More specifically, the service can be provided only when the electronic document is outputted to the medium in a layout for ordinary use (a layout in which one page of the electronic document is simply allocated to one page of the medium), and there has been the problem that the service cannot be provided by outputting the electronic document to the medium in a free layout.

There has also been the problem that, in case of so-called "patching" in which parts of an image printed on a medium are clipped and then pasted on another medium, the relations between the clipped fragments and electronic documents being sources are liable to be lost.

SUMMARY OF THE INVENTION

The present invention has been made in view of the above circumstances and provides a position information management system.

BRIEF DESCRIPTION OF THE DRAWINGS

Embodiments of the present invention will be described in detail based on the following figures, wherein:

FIG. 5 is a diagram showing a table which is referred to in the operation of the identification information management server in the first embodiment of the invention;

FIG. 6 is a diagram showing examples of the contents of a correspondent information DB in the first embodiment of the invention;

FIG. 15 is a flow chart showing the operation of the image processing section of the image forming apparatus in the second embodiment of the invention; and FIGS. 16A and 16B are diagrams showing examples of the contents of a correspondent information DB in the second embodiment of the invention.

DETAILED DESCRIPTION OF THE INVENTION

Now, embodiments of the present invention will be described in detail with reference to the accompanying drawings.

First Embodiment

Figure 1:
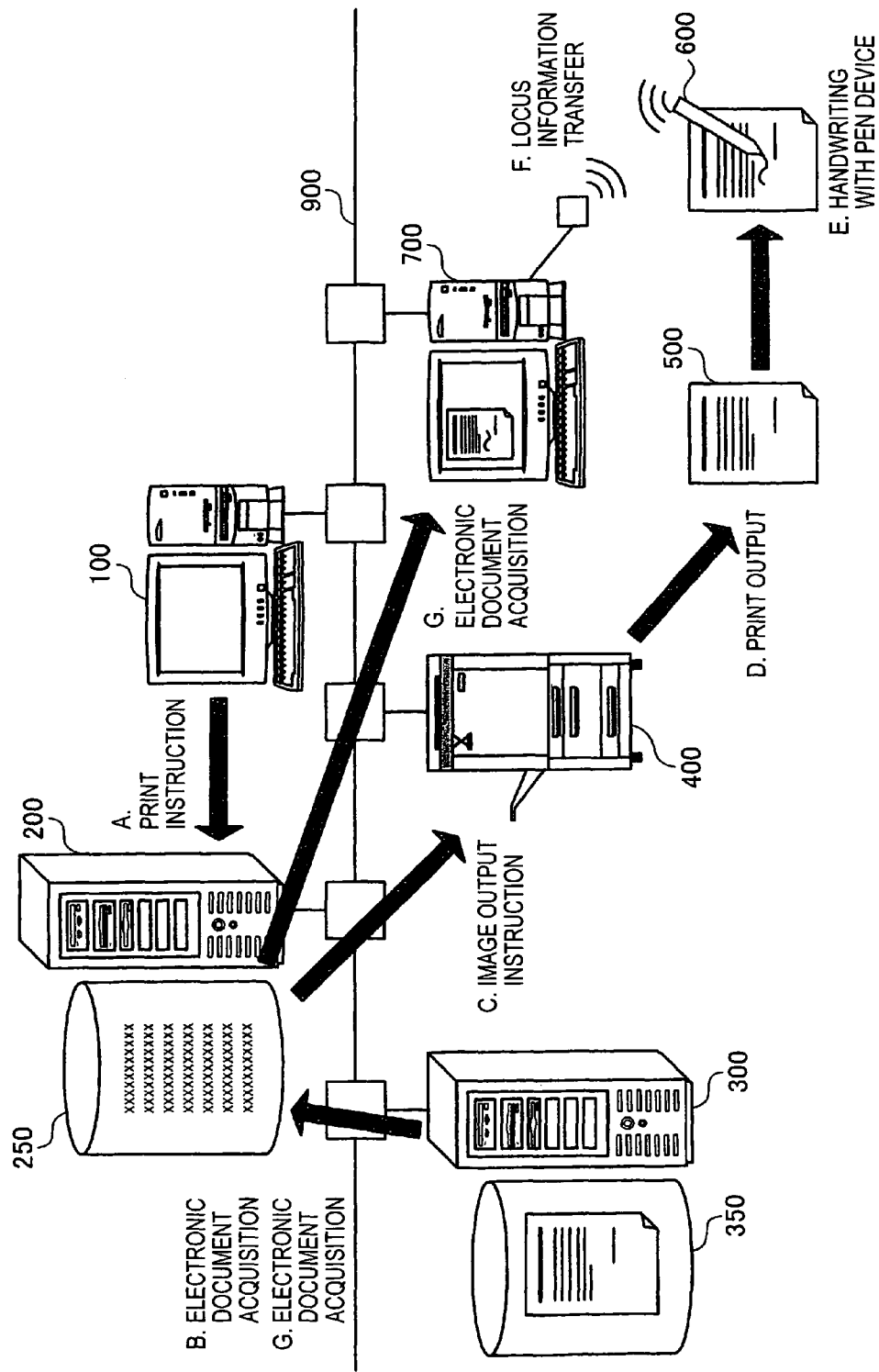
FIG. 1 is a diagram showing the general configuration of a system to which a first embodiment of the present invention is applied.

FIG. 1 shows an example of the configuration of a system to which the first embodiment of the invention is applied. The system is configured in such a way that, at least, a terminal device 100 for instructing the print of an electronic document, an identification information management server 200 for managing identification information which is affixed to a medium in printing the electronic document, and for generating an image in which a code image containing the identification information, etc. is superposed on the image of the electronic document, a document management server 300 for managing the electronic document, and an image forming apparatus 400 for printing the image in which the code image is superposed on the image of the electronic document, are connected to a network 900.

Besides, an identification information repository 250 which is a storage device for storing identification information is connected to the identification information management server 200, and a document repository 350 which is a storage device for storing electronic documents is connected to the document management server 300.

Further, the system includes an item of printed matter 500 which is outputted by the image forming apparatus 400 in compliance with the instruction from the terminal device 100, and a pen device 600 with which a character or a pattern is recorded on the printed matter 500 and which reads the record information of the character or pattern. Also connected to the network 900 is a terminal device 700 which displays the electronic document managed by the document management server 300 and the record information read by the pen device 600, in superposition.

By the way, in this specification, the term "electronic document" is used, but this does not signify only the electronicized data of a "document" including a text. By way of example, the image data of a picture, a photograph, a pattern, etc. (irrespective of whether they are raster data or vector data), and other printable electronic data shall also be covered within the "electronic document".

The operation of the system will be outlined below.

First, the terminal device 100 instructs the identification information management server 200 to print a code image in superposition on the image of an electronic document managed in the document repository 350 (A). On this occasion, layout information items such as the size and sense of a sheet of paper, scale-down/scale-up, "N-up" (print in which N pages of the electronic document are allocated within one page of the sheet of paper) and double-sided print, are also inputted from the terminal device 100.

Thus, the identification information management server 200 acquires the electronic document in the print instruction, from the document management server 300 (B). Besides, the management server 200 affixes the code image which contains identification information managed in the identification information repository 250 and position information determined in accordance with the layout information, to the image of the acquired electronic document, and it instructs the image forming apparatus 400 to print the resulting image (C). Here, the "identification information" is information for uniquely identifying individual media (sheets of paper) on which the images of electronic documents are printed, while the "position information" is information for specifying coordinate positions (X-coordinates and Y-coordinates) on the individual media.

Thereafter, the image forming apparatus 400 outputs the item of printed matter 500 in compliance with the instruction from the identification information management server 200 (D).

Incidentally, as will be detailed later, the image forming apparatus 400 is assumed to form the code image affixed by the identification information management server 200, as an invisible image by using an invisible toner, and to form the other image (the image of apart contained in the original electronic document) as a visible image by using a visible toner.

On the other hand, a user is assumed to have recorded (handwritten) a character or pattern on the printed matter 500 by employing the pen device 600 (E). Thus, the imaging element of the pen device 600 grasps a certain region on the printed matter 500 so as to obtain position information and identification information. Besides, the locus information of the character or pattern as obtained on the basis of the position information is transmitted to the terminal device 700 by radio or wire, together with the identification information (F). By the way, in the system, the invisible image is formed by employing the invisible toner whose absorption factor for infrared radiation is higher than a prescribed reference, whereby the invisible image can be read by the pen device 600 which is capable of projecting and sensing the infrared radiation.

Thereafter, the terminal device 700 transmits the identification information to the identification information management server 200, thereby to make a request for the transmission of the electronic document corresponding to this identification information. Upon receiving the request, the identification information management server 200 acquires the electronic document corresponding to the identification information, from the document management server 300, and it transmits the acquired electronic document to the terminal device 700 (G). As a result, the electronic document sent from the identification information management server 200 and the locus information sent from the pen device 600 are combined in the terminal device 700, and the combined information is displayed thereon.

Such a configuration, however, is a mere example. By way of example, a single server may well be endowed with the function of the identification information management server 200 and that of the document management server 300. Besides, the function of the identification information management server 200 may well be incarnated by the image processing section of the image forming apparatus 400. Further, the terminal devices 100 and 700 may well be configured as an identical terminal device.

Now, the configuration and operation of the system will be described in tore detail.

Figure 2:
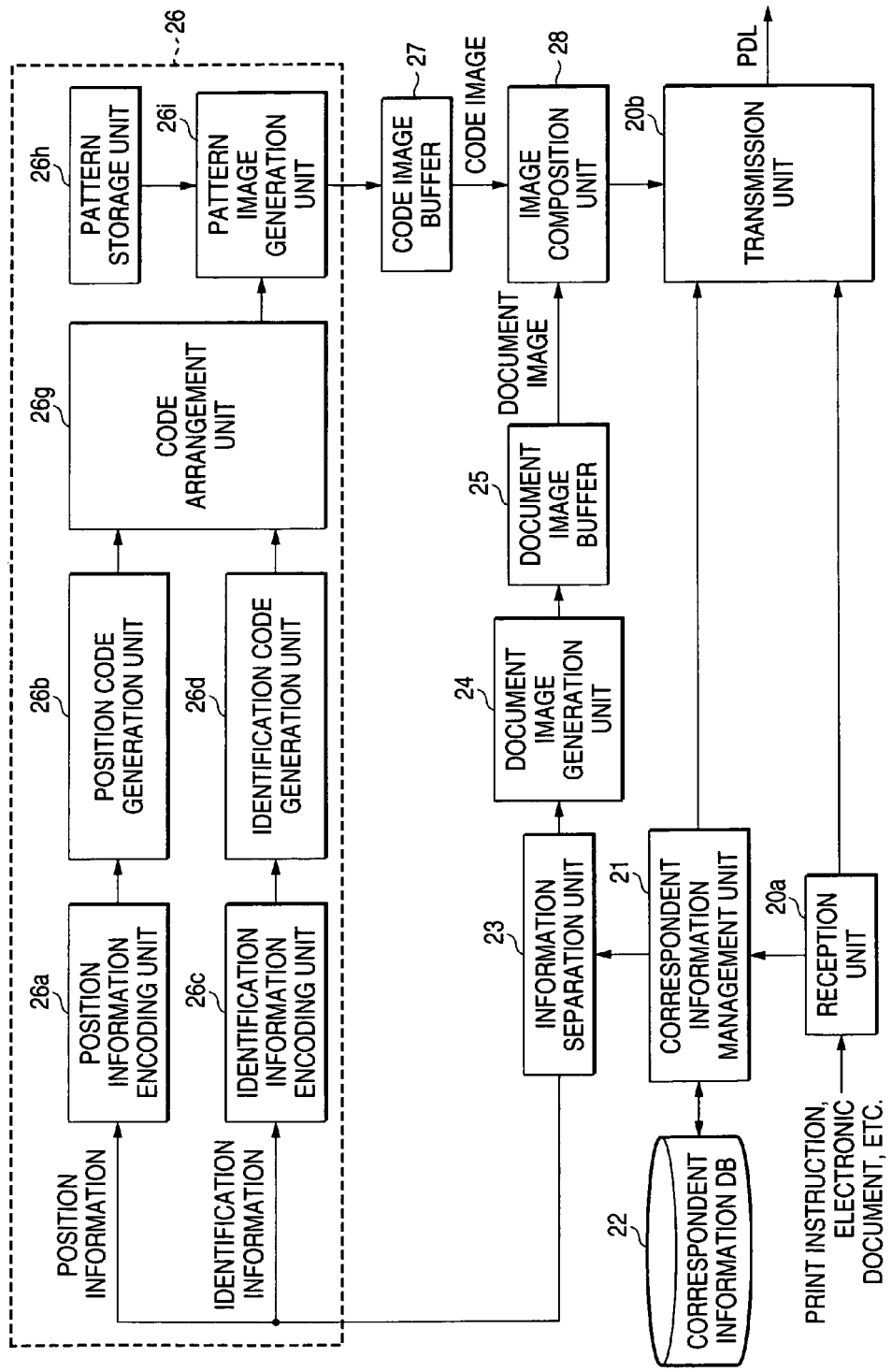
FIG. 2 is a block diagram showing the functional configuration of an identification information management server in the first embodiment of the invention.

FIG. 2 is a diagram showing an example of the configuration of the identification information management server 200.

The identification information management server 200 includes a reception unit 20a, a correspondent information management unit 21, a correspondent information database (DB) 22, an information separation unit 23, a document image generation unit 24, a document image buffer 25, a code image generation section 26, a code image buffer 27, an image composition unit 28, and a transmission unit 20b.

Besides, the code image generation section 26 includes a position information encoding unit 26a, a position code generation unit 26b, an identification information encoding unit 26c, an identification code generation unit 26d, a code arrangement unit 26g, a pattern storage unit 26h, and a pattern image generation unit 26i.

The reception unit 20a receives from the network 900, various information items such as the print instruction which contains the layout information, the electronic document which is to be printed, and that position on the medium which has been designated by the pen device 600. Incidentally, the reception unit 20a can also be grasped as a document acquisition unit from the viewpoint of acquiring the electronic document, and it can also be grasped as a layout acquisition unit from the viewpoint of acquiring the layout information. Besides, it can also be grasped as a position accepting unit from the viewpoint of accepting the designation of the position on the medium.

The correspondent information management unit 21 registers information in the correspondent information DB 22, and reads out information from the correspondent information DB 22. Incidentally, the correspondent information management unit 21 can also be grasped as an information generation unit from the viewpoint of generating the information which is to be registered. Besides, it can also be grasped as a position specifying unit from the viewpoint of specifying the position on the electronic document on the basis of the read-out information.

The correspondent information DB 22 is a database being a storage unit which stores therein the correspondences among the identification information for identifying the medium (hereinbelow, termed "medium ID"), the position information on the medium (hereinbelow, termed "medium address"), the identification information of the electronic document that is the source of an image printed on the medium (hereinbelow, termed "document ID"), the position information on the electronic document (hereinbelow, termed "document address"), and so forth.

The information separation unit 23 separates information delivered from the correspondent information management unit 21, into information which is necessary for the generation of a document image, and information which is necessary for the generation of a code image.

The document image generation unit 24 images the electronic document on the basis of the information necessary for the generation of the document image as has been separated by the information separation unit 23, and it stores the resulting image in the document image buffer 25.

The code image generation section 26 generates the code image on the basis of the information necessary for the generation of the code image as has been separated by the information separation unit 23, and it stores the generated image in the code image buffer 27.

The image composition unit 28 composites the document image stored in the document image buffer 25, and the code image stored in the code image buffer 27.

Incidentally, the document image generation unit 24, code image generation section 26 and image composition unit 28 can also be grasped as an image generation section from the viewpoint of generating an image which is outputted from the image forming apparatus 400.

The transmission unit 20b transmits an instruction for outputting the image composited by the image composition unit 28, to the image forming apparatus 400 in a PDL (Page Description Language) represented by the "PostScript" or the like.

Upon receiving position information, the position information encoding unit 26a encodes the position information in conformity with a predetermined encoding scheme. The encoding can employ, for example, the RS (Reed-Solomon) code or the BCH code which is a known error correcting code. Besides, as an error correcting code, the CRC (Cyclic Redundancy Check) or check sum value of the position information may well be computed so as to affix the value to the position information as a redundant bit. Also, the M-series code which is a kind of pseudo-noise series can be utilized as the position information. The M-series code performs encoding by utilizing the property that, when a partial series of length P is derived from an M series of order P (having a series length of $2^{P-1}$), a bit pattern appearing in the partial series appears only once in the M series.

The position code generation unit 26b translates the encoded position information into a form in which it is embedded as code information. By way of example, the positions of individual bits in the encoded position information can be replaced or encrypted by pseudo random numbers or the likes so that decryption by a third party may become difficult. Besides, in a case where position codes are arranged in two dimensions, bit values are arranged in two dimensions likewise to the arrangement of the codes.

When supplied with identification information, the identification information encoding unit 26c encodes the identification information in conformity with a predetermined encoding scheme. The encoding can use the same scheme as used in the encoding of the position information.

The identification code generation unit 26d translates the encoded identification information into a form in which it is embedded as code information. By way of example, the positions of individual bits in the encoded identification information can be replaced or encrypted by pseudo random numbers or the likes so that decryption by a third party may become difficult. Besides, in a case where identification codes are arranged in two dimensions, bit values are arranged in two dimensions likewise to the arrangement of the codes.

The code arrangement unit 26g combines the encoded position information and the encoded identification information which are arranged in the same forms as those of the codes, thereby to generate a two-dimensional code array which corresponds to an output image size. On this occasion, codes obtained by encoding the position information items which are different depending upon the arrangement positions are used as the encoded position information, and codes obtained by encoding the information items which are identical irrespective of the positions are used as the encoded identification information.

The pattern image generation unit 26i checks the bit values of array elements in the two-dimensional code array, and it acquires a bit pattern image corresponding to the individual bit values, from the pattern storage unit 26h, so as to output the bit pattern image as a code image into which the two-dimensional code array is imaged.

Incidentally, these functional parts are incarnated by the cooperation between software and hardware resources. Concretely, the unshown CPU of the identification information management server 200 loads programs which incarnate the respective functions of the reception unit 20a, correspondent information management unit 21, information separation unit 23, document image generation unit 24, code image generation section 26, image composition unit 28 and transmission unit 20b, from an external storage device into a main storage device, and it executes processes.

Next, there will be described an operation in the case where the identification information management server 200 transmits an image output instruction to the image forming apparatus 400 in compliance with an instruction from the terminal device 100. Here, it is assumed that the scale-down/scale-up and the "N-up" are designated as the layout information of course, "100%" may well be designated as the ratio of the scale-down/scale-up, and "1-up" in which one page of the electronic document is allocated to one page of the medium may well be designated as the N-up.

Shown in FIG. 3 is a case where, by way of example, an electronic document of document ID "Doc1" is printed on a medium of medium ID "ID1" in accordance with 2-up. By the way, in this embodiment, it is assumed that the corresponding relation between a certain region on the electronic document and a certain region on the medium are expressed using the coordinates of the left upper points of the respective regions and those of the right lower points thereof.

Figure 3A:
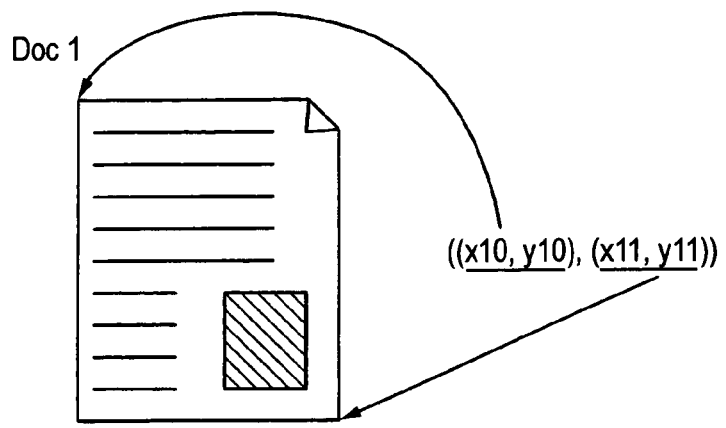
FIGS. 3A and 3B are views showing an example of printing in the first embodiment of the invention.
Figure 3B:
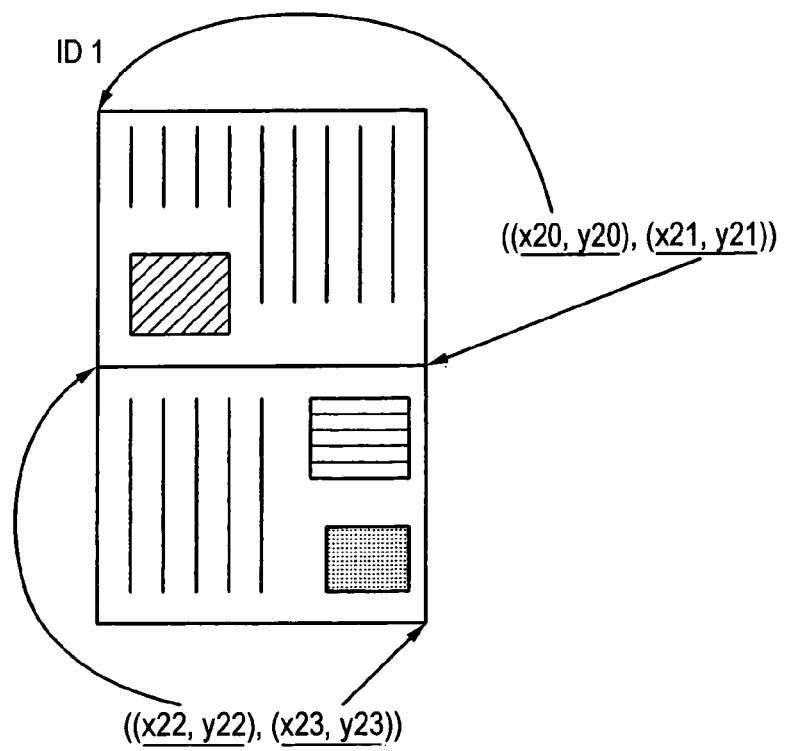

More specifically, a page shown in FIG. 3A is expressed as ((x10, y10), (x11, y11)), while that upper-half page in FIG. 3B to which the document page is allocated is expressed as ((x20, y20), (x21, y21)). Besides, a lower-half page in FIG. 3B is expressed as ((x22, y22), (x23, y23)). Incidentally, that page of the electronic document which is allocated to the lower-half page is omitted from illustration.

Now, there will be described a detailed operation in the case where such printing is done.

In the identification information management server 200, first of all, the reception unit 20a receives a print instruction which contains the document ID and layout information, from the terminal device 100. Besides, the reception unit 20a delivers the received information to the correspondent information management unit 21.

Figure 4:
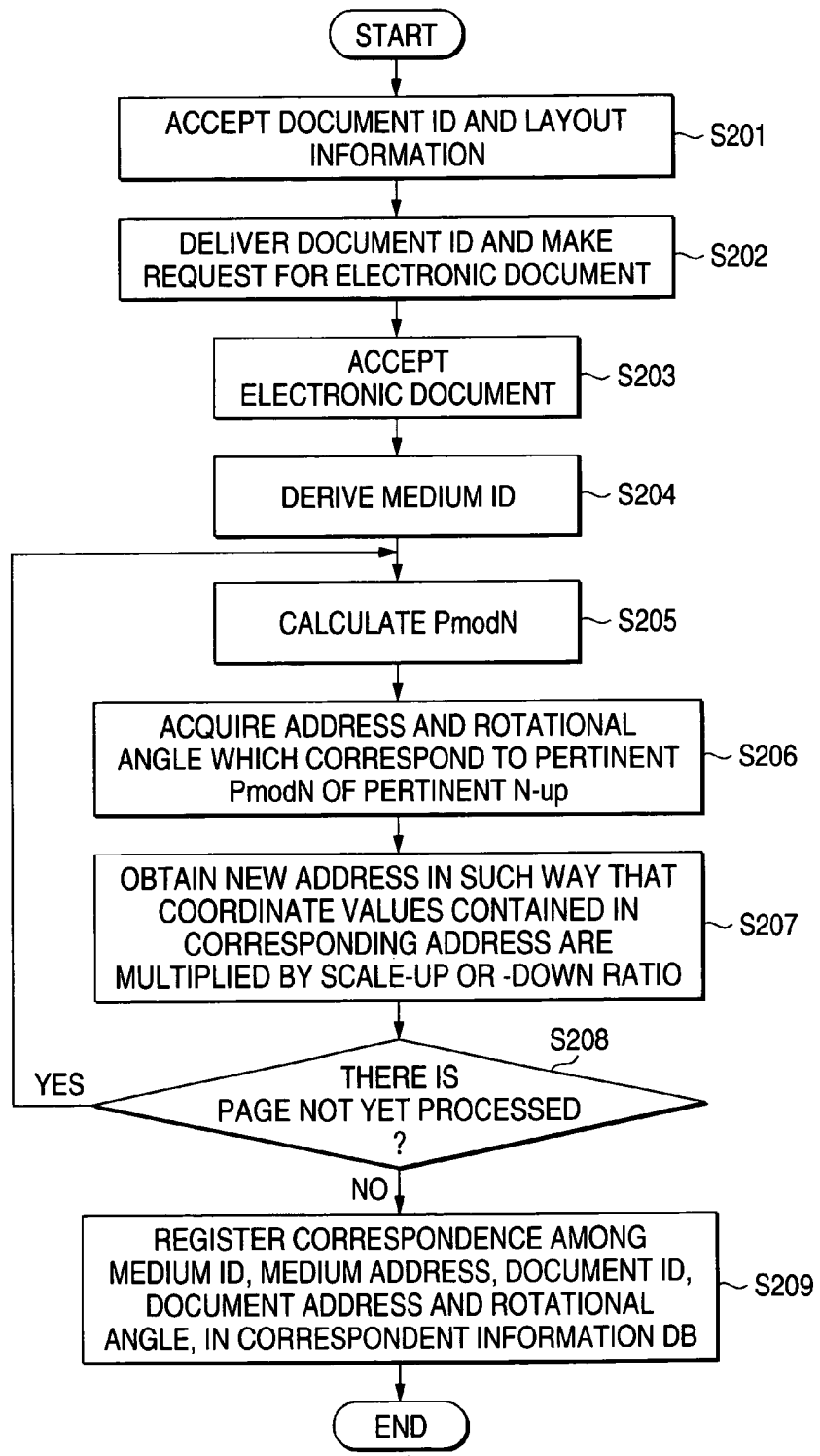
FIG. 4 is a flow chart showing an operation in the case where the identification information management server in the first embodiment of the invention generates correspondent information.

Thus, the correspondent information management unit 21 executes a process as shown in FIG. 4.

First, the correspondent information management unit 21 accepts the print instruction which contains the document ID and the layout information, from the reception unit 20a (step 201). Subsequently, the correspondent information management unit 21 holds these information items, and it delivers the document ID to the transmission unit 20b and instructs this transmission unit 20b to transmit a request for the acquisition of the electronic document corresponding to the document ID (step 202). The transmission unit 20b having received the instruction requests the document management server 300 to transmit the electronic document.

Thus, the document management server 300 transmits the electronic document to be printed to the identification information management server 200, in which the reception unit 20a receives the electronic document and delivers it to the correspondent information management unit 21.

Here, the process shifts to the processing of the correspondent information management unit 21 again, and the correspondent information management unit 21 accepts the electronic document from the reception unit 20a (step 203). Besides, the management unit 21 derives identification information for use as the medium ID, from the identification information repository 250 (refer to FIG. 1) (step 204).

Subsequently, the correspondent information management unit 21 calculates that position (address) on the medium at which each page of the electronic document is arranged when the page has been printed on the medium in accordance with the layout information.

Here, it is assumed that, regarding the N-up, a table as shown in FIG. 5 is created beforehand. The table in FIG. 5 includes a column "N-up", a column "PmodN", a column "address" and a column "rotational angle". Here, the sorts of the N-up, such as 1-up, 2-up and 4-up, are stored in the "N-up" column. Besides, remainders which are obtained by dividing page Nos. by N are stored in the "PmodN" column. Further, addresses and rotational angles which correspond to the values stored in the "PmodN" column are respectively stored in the "address" column and the "rotational angle" column.

In the case of, for example, the 2-up, the corresponding addresses on the medium become different between the page (even-numbered page), as to which the remainder with the page No. divided by 2 is "0", and the page (odd-numbered page), as to which the remainder with the page No. divided by 2 is "1". Therefore, the addresses are associated by classifying the pages into the even-numbered page and the odd-numbered page. Besides, in the case of the 2-up, each page of the electronic document is printed on the medium through the rotation of 90° as also seen from FIGS. 3A and 3B, and hence, this fact is stored in the "rotational angle" column.

Besides, in case of the 4-up, the addresses and the rotational angles are stored for respective pages as to which the remainders with the page Nos. divided by 4 are "0", "1", "2" and "3", from the same point of view as in the case of the 2-up. In the case of the 4-up, however, no rotation is necessary in printing the electronic document on the medium, and hence, "0's" are stored in the "rotational angle" column.

Incidentally, various aspects other than those shown in FIG. 5 are considered as the "N-up". In general, a value equal to the nth power of 2 (n being a positive integer), such as 8, 16 or 32, is adopted as N, but this is not necessarily restrictive. Whatever value is adopted as the N, the individual pages of the electronic document can be arranged at desired positions on the medium as long as information items as shown in FIG. 5 are defined.

Referring back to FIG. 4 again, the correspondent information management unit 21 repeats the processing of steps 205-208 for the number of pages. More specifically, when a page to-be-processed is the Pth one of the pages to be printed, processing to be stated below is executed.

First, the correspondent information management unit 21 calculates that value of PmodN which is the remainder with the value P divided by the value N (step 205). Besides, the management unit 21 refers to the table in FIG. 5 so as to acquire an address and a rotational angle corresponding to the PmodN value calculated at the step 205, among the addresses and rotational angles corresponding to the N-up designated as the layout information (step 206). In addition, the management unit 21 multiplies coordinate values contained in the address acquired here, by a scale-up or -down ratio designated as the layout information, thereby to obtain a new address (step 207). The new address corresponds to the medium address in the case where the Pth page of the electronic document has been printed on the basis of the layout information.

Thereafter, the correspondent information management unit 21 decides the presence or absence of any page of the electronic document as is not processed yet (step 208). In the presence of the unprocessed page as a result, the management unit 21 returns to the step 205, and in the absence, the management unit 21 registers the correspondence among the medium ID, medium address, document ID, document address and rotational angle, in the correspondent information DB 22 (step 209).

By the way, in the above description, regarding the N-up, the information items have been registered in the correspondent information DB 22 by referring to the table in FIG. 5, but similar logics may well be described as a program beforehand.

The contents of the correspondent information DB 22 on this occasion are shown in FIG. 6.

FIG. 6 exemplifies the information items which are registered in the case where the printing has been done in accordance with the 2-up shown in FIG. 3. More specifically, it indicates that the region ((x10, y10), (x11, y11)) which is the first page of the electronic document of the document ID "Doc1" is printed in the region ((x20, y20), (x21, y21)) on the medium of the medium ID "ID1". Also, it indicates that the region ((x10, y10), (x11, y11)) which is the second page of the electronic document of the document ID "Doc1" is printed in the region ((x22, y22), (x23, y23)) on the same medium.

When the information items have been registered in the correspondent information DB 22 in this manner, the correspondent information management unit 21 delivers the electronic document, medium ID and medium address to the information separation unit 23.

The information separation unit 23 separates the delivered information items into information necessary for code generation (the medium ID and the medium address) and information necessary for the generation of a document image (the electronic document), and it outputs the former to the code image generation section 26 and the latter to the document image generation unit 24.

Thus, the medium address is encoded in the position information encoding unit 26a, and a position code indicative of the encoded medium address is generated in the position code generation unit 26b. Besides, the medium ID is encoded in the identification information encoding unit 26c, and an identification code indicative of the encoded medium ID is generated in the identification code generation unit 26d.

In addition, a two-dimensional code array corresponding to an output image size is generated by the code arrangement unit 26g, and a pattern image corresponding to the two-dimensional code array is generated by the pattern image generation unit 26i.

On the other hand, the document image generation unit 24 generates the document image of the electronic document.

Lastly, the document image generated by the document image generation unit 24 here and the code image generated by the code image generation section 26 before are composited in the image composition unit 28, and the resulting image is delivered to the transmission unit 20b. Thus, the transmission unit 20b transmits an output instruction for the composited image, to the image forming apparatus 400.

In compliance with the image output instruction, the image forming apparatus 400 prints onto the medium, the composited image of the document image of the electronic document to be printed and the code image, so that the user obtains the printed matter 500.

Next, the image forming apparatus 400 will be described in detail.

Figure 7:
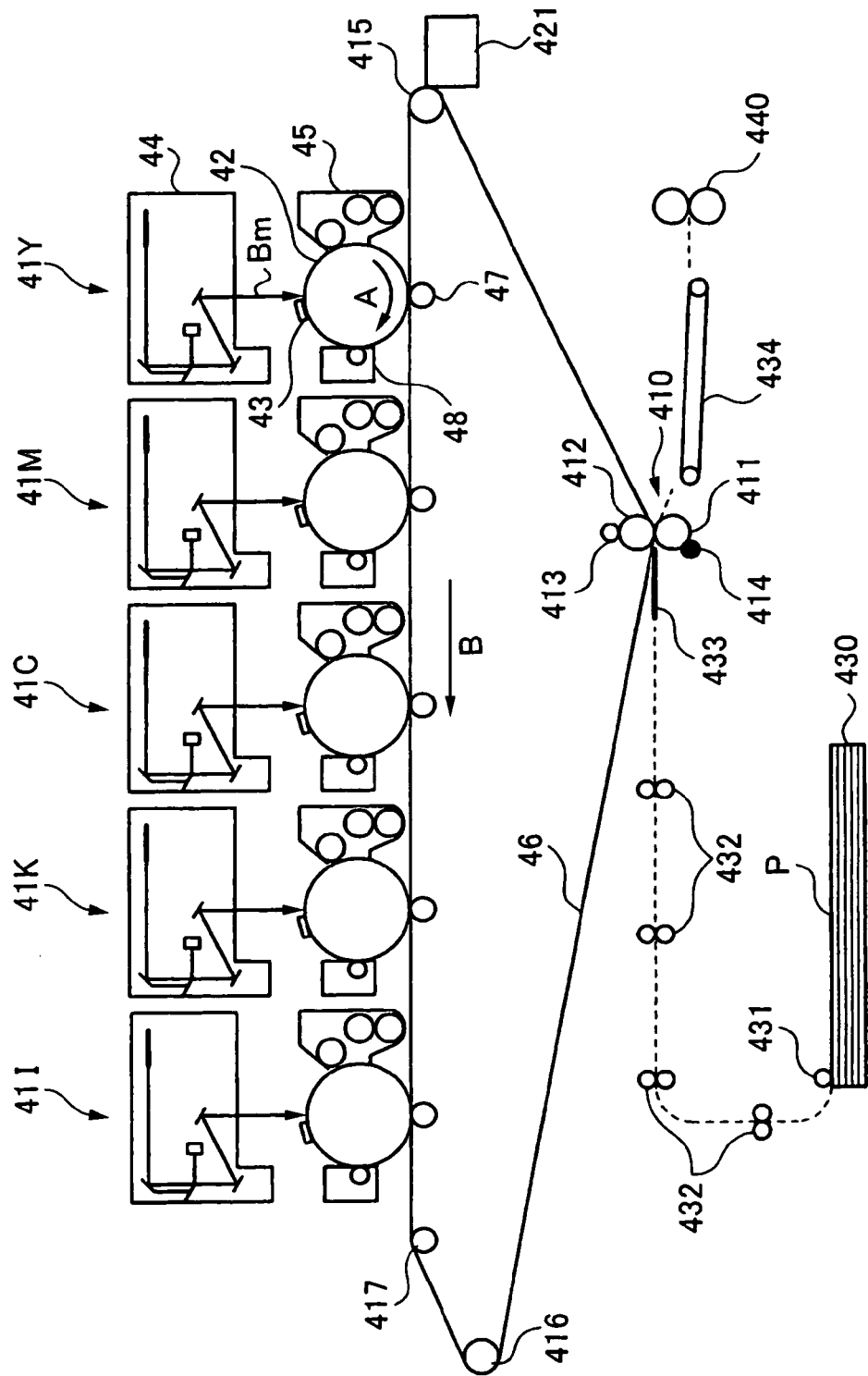
FIG. 7 is a diagram showing a configurational example of an image forming apparatus in the embodiment of the invention.

FIG. 7 is a diagram showing a configurational example of the image forming apparatus 400. The image forming apparatus 400 shown in FIG. 7 is an apparatus of so-called "tandem type". It includes, for example, a plurality of image formation units 41 (41Y, 41M, 41C, 41K and 41I) in which toner images of respective color components are formed by an electrophotographic scheme, an intermediate transfer belt 46 onto which the toner images of the respective color components formed by the image formation units 41 are successively transferred (primarily transferred) so as to be held thereon, a secondary transfer device 410 in which the superposed images transferred on the intermediate transfer belt 46 are collectively transferred (secondarily transferred) onto a sheet of paper (medium) P, and a fixation device 440 which fixes the secondarily transferred images onto the sheet of paper P.

In the image forming apparatus 400, not only the image formation units 41Y, 41M and 41C which form the toner images of yellow (Y), magenta (M) and cyan (C) being ordinary colors, respectively, but also the image formation unit 41K which forms the toner image of black (K) having no absorption for infrared radiation, and the image formation unit 41I which forms the toner image being invisible are disposed as the image formation units which constitute a tandem.

Besides, in the image formation unit 41I, there is used a color material which absorbs the infrared radiation more than a Y toner, an M toner, a C toner and a K toner that are respectively used in the image formation units 41Y, 41M, 41C and 41K. Mentioned as such a color material is, for example, one which contains vanadyl naphthalocyanine. Incidentally, the K toner which is used in the image formation unit 41K should desirably be a color material which absorbs the infrared radiation less than the color material used in the image formation unit 41I, in order to facilitate the detection of the code image more. Here, it is also possible to use a conventional color material which absorbs the infrared radiation, such as a color material containing carbon.

In this embodiment, each of the image formation units 41 (41Y, 41M, 41C, 41K and 41I) is such that, around a photosensitive drum 42 which is rotated in the direction of arrow A, there are successively disposed the electrophotographic devices of an electric charger 43 which charges the photosensitive drum 42, a laser exposer 44 which writes an electrostatic latent image onto the photosensitive drum 42 (in the figure, an exposure beam is indicated by sign Bm), a developer 45 in which the toner of the corresponding color component is accommodated and which visualizes the electrostatic latent image on the photosensitive drum 42 with the toner, a primary transfer roll 47 by which the toner image of the corresponding color component formed on the photosensitive drum 42 is transferred onto the intermediate transfer belt 46, and a drum cleaner 48 which removes the toner remaining on the photosensitive drum 42. Such image formation units 41 are arranged in the order of the yellow (Y color), magenta (M color), cyan (C color), black (K color) and invisible (I color) image formation units as viewed from the upstream side of the intermediate transfer belt 46.

Besides, the intermediate transfer belt 46 is configured so as to be turnable in a direction B indicated in the figure, owing to various rolls. Included as the various rolls are a drive roll 415 which is driven by a motor not shown, so as to turn the intermediate transfer belt 46, a tension roll 416 which exerts a prescribed tension on the intermediate transfer belt 46 and which has the function of preventing the intermediate transfer belt 46 from meandering, an idle roll 417 which supports the intermediate transfer belt 46, and a backup roll 412 (to be stated later).

Besides, voltages whose polarities are opposite to the charging polarities of the toners are applied to the primary transfer rolls 47, whereby the toner images on the respective photosensitive drums 42 are electrostatically attracted to the intermediate transfer belt 46 in succession, and the superposed toner images are formed on the intermediate transfer belt 46. Further, the secondary transfer device 410 includes a secondary transfer roll 411 which is arranged in pressed touch with the side of the toner image bearing surface of the intermediate transfer belt 46, and a backup roll 412 which is arranged on the side of the rear surface of the intermediate transfer belt 46 and which forms a counterelectrode to the secondary transfer roll 411. A metallic power feed roll 413 to which a secondary transfer bias is stably applied, is arranged in abutment on the backup roll 412. In addition, a brush roll 414 which removes stains having adhered to the secondary transfer roll 411 is arranged in touch with this secondary transfer roll 411.

Besides, a belt cleaner 421 which cleans the front surface of the intermediate transfer belt 46 after the secondary transfer is disposed on the downstream side of the secondary transfer roll 411.

Further, in this embodiment, a sheet-of-paper conveyance system includes a sheet-of-paper tray 430 which accommodates the sheets of paper P, a pickup roll 431 which picks up one of the sheets of paper P stacked in the sheet-of-paper tray 430, at a predetermined timing so as to convey the sheet of paper P, conveyance rolls 432 which convey the sheet of paper P delivered by the pickup roll 431, a conveyance chute 433 which feeds the sheet of paper P conveyed by the conveyance rolls 432, to the position of the secondary transfer by the secondary transfer device 410, and a conveyance belt 434 which conveys the sheet of paper P after the secondary transfer, to the fixation device 440.

Next, the image formation process of the image forming apparatus 400 will be described. When a start switch (not shown) is turned ON by a user, the predetermined image formation process is performed. Concretely, in a case, for example, where the image forming apparatus 400 is configured as a color printer, digital image signals transmitted from the network 900 are temporarily accumulated in a memory, and the toner images of the respective colors are formed on the basis of the accumulated digital image signals of the five colors (Y, M, C, K and I).

More specifically, the image formation units 41 (41Y, 41M, 41C, 41K and 41I) are respectively driven on the basis of the image record signals of the respective colors obtained by image processing. Besides, in the image formation units 41Y, 41M, 41C, 41K and 41I, the electrostatic latent images corresponding to the image record signals are respectively written onto the photosensitive drums 42 uniformly charged by the chargers 43, by the laser exposers 44. In addition, the written electrostatic latent images are respectively developed by the developers 45 in which the toners of the corresponding colors are accommodated, whereby the toner images of the respective colors are formed.

Besides, the toner images formed on the photosensitive drums 42 are respectively primarily transferred from the photosensitive drums 42 onto the front surface of the intermediate transfer belt 46 by the primary transfer biases applied by the primary transfer rolls 47, at primary transfer positions at which the photosensitive drums 42 and the intermediate transfer belt 46 are held in touch. The toner images thus primarily transferred onto the intermediate transfer belt 46 are superposed on one another on this intermediate transfer belt 46, and are conveyed to a secondary transfer position with the turning of the intermediate transfer belt 46.

On the other hand, the sheet of paper P is conveyed to the secondary transfer position of the secondary transfer device 410 at the predetermined timing, and the secondary transfer roll 411 nips the sheet of paper P relative to the intermediate transfer belt 46 (backup roll 412). Besides, the superposed toner images borne on the intermediate transfer belt 46 are secondarily transferred onto the sheet of paper P under the action of a secondary-transfer electric field which is established between the secondary transfer roll 411 and the backup roll 412.

Thereafter, the sheet of paper P on which the toner images have been transferred is conveyed to the fixation device 440 by the conveyance belt 434, and the toner images are fixed there. On the other hand, the intermediate transfer belt 46 after the secondary transfer has the remaining toners removed by the belt cleaner 421.

Figure 8:
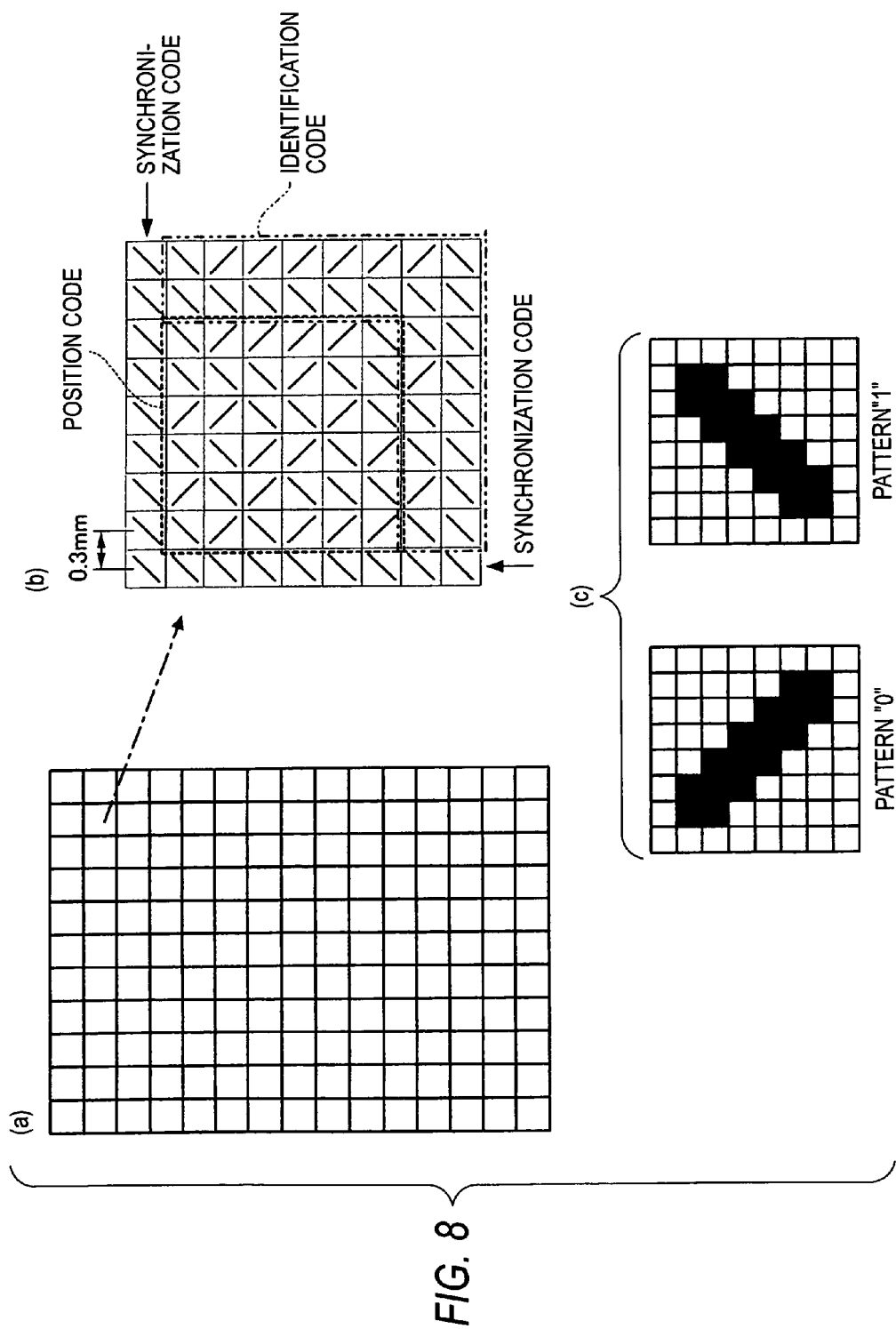
FIG. 8 is a diagram for explaining a two-dimensional code image which is printed on a medium in the embodiment of the invention.

FIG. 8(*a*)-(*c*) are diagrams for explaining a two-dimensional code image which is generated by the code image generation section 26 of the identification information management server 200, and which is printed by the image forming apparatus 400. FIG. 8(*a*) is the diagram in which the units of the two-dimensional code image formed and arranged by an invisible image are expressed in the shape of grids for a schematic illustration. Besides, FIG. 8(*b*) is the diagram showing one unit of the two-dimensional code image as which the invisible image is recognized by infrared irradiation. Further, FIG. 8(*c*) is the diagram for explaining the oblique line patterns of a backslash "\" and a slash "/".

The two-dimensional code image which is formed by the image forming apparatus 400 is formed using, for example, an invisible toner whose maximum absorption factor in a visible radiation region (400 nm-700 nm) is, for example, 7% or below, and whose absorption factor in a near-infrared region (800 nm-1000 nm) is, for example, 30% or above. Besides, the invisible toner to be adopted should have mean variance diameters within a range of 100 nm-600 nm, in order to heighten a near-infrared radiation absorbability necessary for the machine reading of the image. Here, the "visible" and "invisible" conditions do not concern if the image can be recognized by eye inspection. These "visible" and "invisible" conditions are distinguished depending upon if the image formed on the printed medium can be recognized in accordance with the presence or absence of a color developing property based on the absorption of a specified wavelength in the visible radiation region.

The two-dimensional code image shown in FIGS. 8(*a*)-8(*c*) is formed of the invisible image which can be subjected to the machine reading based on the infrared irradiation and to a decoding process, stably for a long term, and which can record information at a high density. Besides, it is favorable that the invisible image can be provided at any desired region irrespective of that region of the front surface of the medium for outputting the image which is provided with the visible image. In this embodiment, the invisible image is formed on the whole area of one medium surface (paper surface) in conformity with the size of the medium to be printed. Besides, it is more favorable that the invisible image can be recognized by, for example, a luster difference in the eye inspection. In the above, the "whole area" does not signify that all of the four corners of the sheet of paper are included. In the apparatus of the electrophotographic scheme or the like, the peripheral edge of the paper surface is often an unprintable extent, so that the invisible image need not be printed in such an extent.

The two-dimensional code pattern shown in FIG. 8(*b*) includes a region where a position code indicating a coordinate position on the medium is stored, and a region where an identification code for uniquely specifying the electronic document or the print medium is stored. Also, it includes regions where synchronization codes are stored. Besides, as shown in FIG. 8(*a*), a plurality of such two-dimensional code patterns are arranged, and two-dimensional codes in which different position information items are stored are arranged in the shape of the grids on the whole area of one medium surface (paper surface) in conformity with the size of the medium to be printed. That is, the plurality of two-dimensional code patterns each being as shown in FIG. 8(b) are arranged on one medium surface, and each of them includes the position code, the identification code and the synchronization codes. Here, the position information items which are respectively different depending upon arrangement locations are stored in the regions of the plurality of position codes. In contrast, the identification information which is identical irrespective of arrangement locations is stored in the regions of the plurality of identification codes.

Referring to FIG. 8(b), the position code is arranged in a rectangular region of 6 bits×6 bits. Individual bit values are formed of a plurality of minute line bit maps of different rotational angles, and a bit value "0" and a bit value "1" are respectively expressed by the oblique line patterns (pattern "0" and pattern "1") shown in FIG. 8(c). More concretely, the bit "0" and the bit "1" are expressed using the backslash "\" and the slash "/" which have inclinations different from each other. Each oblique line pattern is formed having a size of 8×8 pixels at 600 dpi, and the oblique line pattern rising leftward (pattern "0") expresses the bit value "0", while the oblique line pattern rising rightward (pattern "1") expresses the bit value "1". Accordingly, information of one bit ("0" or "1") can be expressed by one oblique line pattern. Using the minute line bit maps which have such inclinations of two sorts, it is permitted to provide the two-dimensional code patterns which exert very little noise on the visible image, and with which a large quantity of information items can be digitized and embedded at a high density.

More specifically, the position information items totaling 36 bits are stored in the position code region shown in FIG. 8(b). Among the 36 bits, 18 bits can be used for encoding an X-coordinate value, and the remaining 18 bits for encoding a Y-coordinate value. When all the pairs of 18 bits are used for encoding positions, $2^{18}$ (about 260 thousand) positions can be encoded. In the case where each oblique line pattern is formed of 8 pixels×8 pixels (600 dpi) as shown in FIG. 8(c), one dot of 600 dpi is 0.0423 mm long, and hence, the size of the two-dimensional code (including the synchronization codes) in FIG. 8(b) becomes about 3 mm (8 pixels×9 bits×0.0423 mm) in both length and width. In case of encoding 260 thousand positions at intervals of 3 mm, a length of about 786 m can be encoded. All of the 18 bits may be used for the encoding of the positions in this manner, or a redundant bit for error detection or error correction may well be included in the 18 bits in such a case where the detection errors of the oblique line patterns occur.

Besides, the identification code is arranged in a rectangular region of 2 bits×8 bits and 6 bits×2 bits, and it can store identification information totaling 28 bits. In case of using the 28 bits as the identification information, $2^{28}$ (about 270 million) identification information items can be expressed. Likewise to the position code, the identification code can include a redundant bit for error detection or error correction, in the 28 bits.

By the way, in the example shown in FIG. 8(c), the two oblique line patterns have the angular difference of 90 degrees therebetween but four sorts of oblique line patterns: can be formed when an angular difference is set at 45 degrees. In case of such formation, information of two bits ("0"-"3") can be expressed by one oblique line pattern. In this way, that number of bits which is expressible can be enlarged by increasing the sorts of oblique line patterns based on an angular difference.

Besides, in the example shown in FIG. 8(c), the encoding of the bit values has been described using the oblique line patterns, but patterns which can be selected are not restricted to the oblique line patterns. It is also possible to adopt a method in which the encoding is based on the ON/OFF of dots or on the directions of shifting the positions of dots from a reference position.

Next, the pen device 600 will be described in detail.

Figure 9:
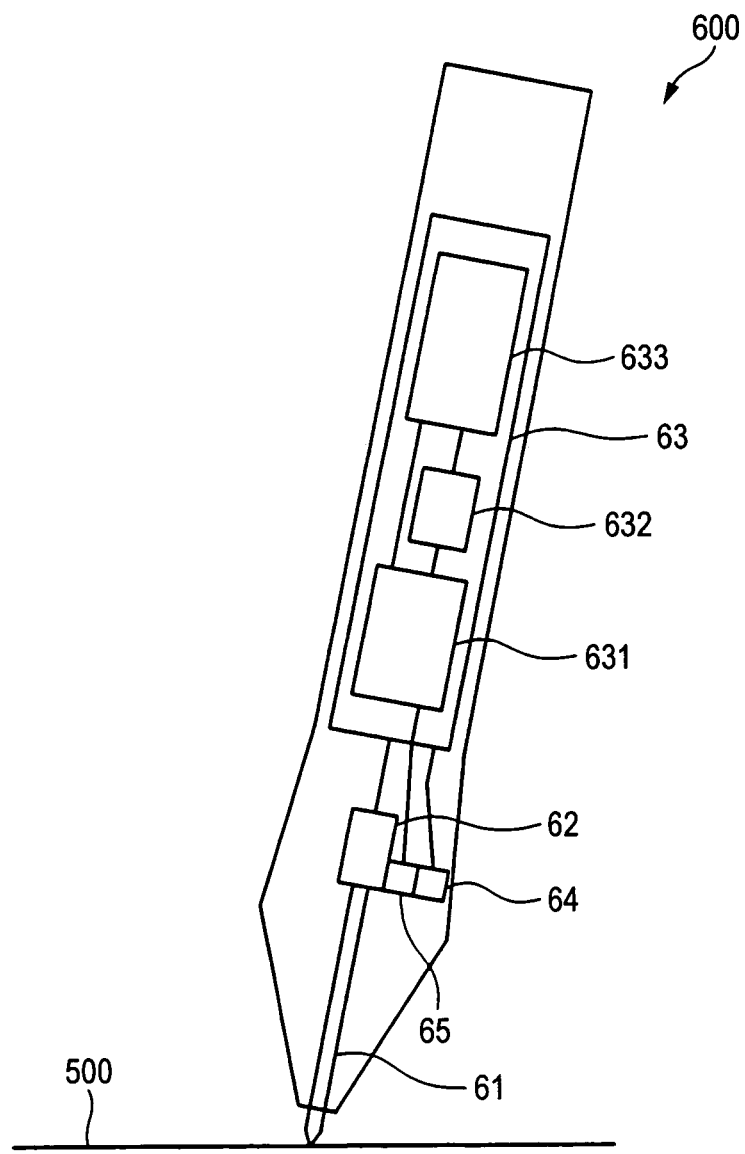
FIG. 9 is a view showing a configurational example of a pen device in the embodiment of the invention.

FIG. 9 is a view showing the configuration of the pen device 600.

The pen device 600 includes a handwriting portion 61 with which a character or a pattern is recorded by a manipulation similar to that of an ordinary pen, on a sheet of paper (medium) printed with a code image and a document image that have been composited, and a writing-pressure detection portion 62 which monitors the movement of the handwriting portion 61 so as to detect that the pen device 600 is pressed against the sheet of paper. Besides, the pen device 600 includes a control portion 63 which controls the electronic operation of the whole pen device 600, an infrared projection portion 64 which projects infrared radiation in order to read the code image on the sheet of paper, and an image input portion 65 which receives reflected infrared radiation, thereby to recognize and input the code image.

Here, the control portion 63 will be described in more detail.

The control portion 63 includes a code acquisition portion 631, a locus calculation portion 632 and an information storage portion 633. The code acquisition portion 631 is a portion which analyzes the image inputted from the image input portion 65, so as to acquire a code. The locus calculation portion 632 is a portion which corrects the deviation between the coordinates of the pen tip of the handwriting portion 61 and the coordinates of the image grasped by the image input portion 65, for the code acquired by the code acquisition portion 631, so as to calculate the locus of the pen tip. The information storage portion 633 is a portion which stores therein the code acquired by the code acquisition portion 631, and the locus information calculated by the locus calculation portion 632.

Figure 10:
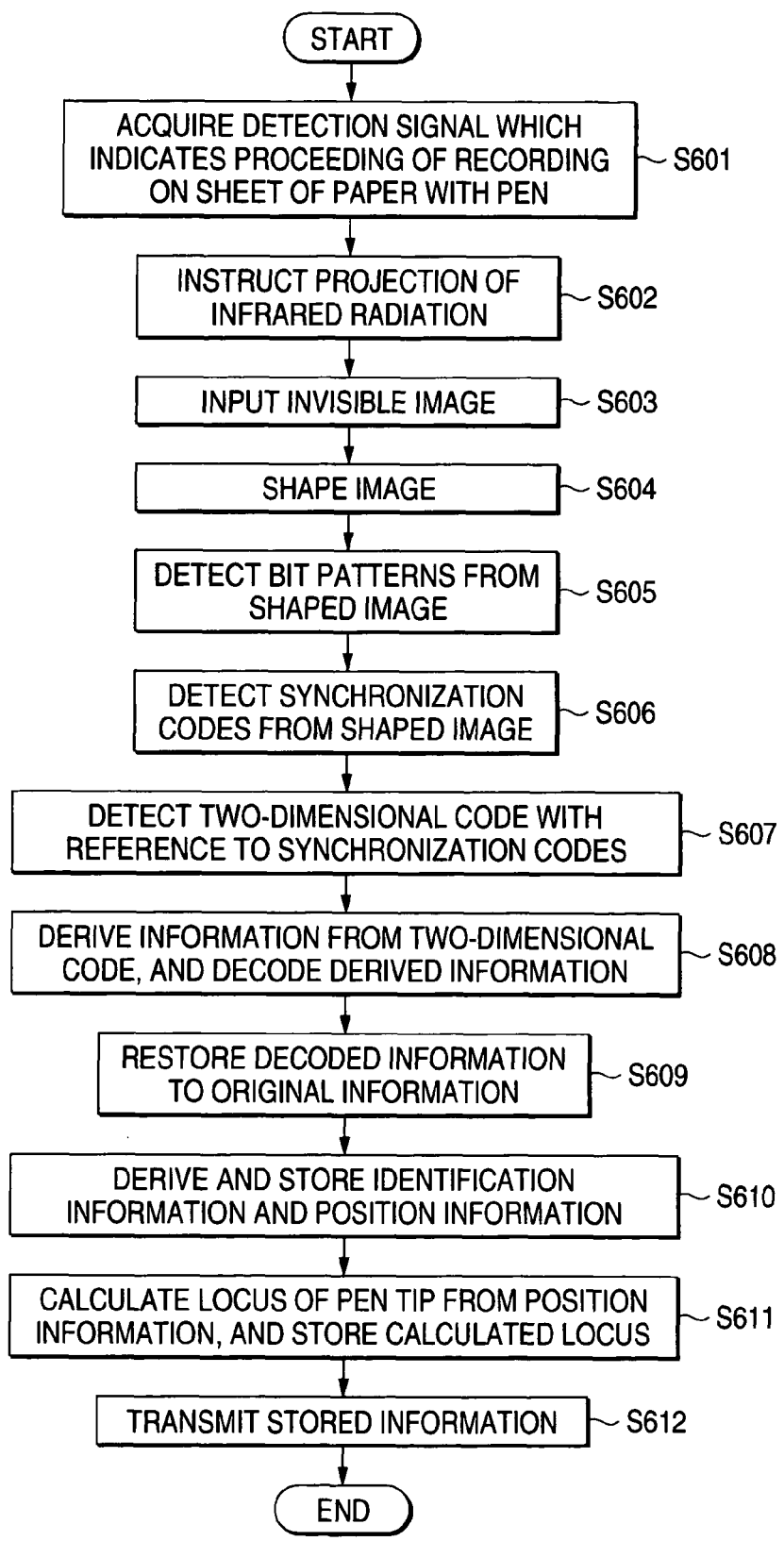
FIG. 10 is a flow chart showing the operation of the pen device in the embodiment of the invention.

FIG. 10 is a flow chart showing a process which is mainly executed by the control portion 63 of the pen device 600. When the pen device 600 is used for recording a character or a pattern on a sheet of paper by way of example, the control portion 63 acquires from the writing-pressure detection portion 62, a detection signal which indicates the proceeding of the recording on the sheet of paper with the pen (step 601). Upon detecting the detection signal, the control portion 63 instructs the infrared projection portion 64 to project infrared radiation onto the sheet of paper (step 602). The infrared radiation projected onto the sheet of paper by the infrared projection portion 64 is absorbed by an invisible image, and is reflected from any other part. The image input portion 65 receives the reflected infrared radiation, and it recognizes as the code image, the part from which the infrared radiation has not been reflected. The control portion 63 inputs (scans) the code image from the image input portion 65 (step 603).

Thereafter, code image detection processing indicated at steps 604-610 is executed in the code acquisition portion 631 of the control portion 63. First, the code acquisition portion 631 shapes the inputted scan image (step 604). The shaping of the scan image includes a slope correction, noise removal, etc. Besides, bit patterns (oblique line patterns) such as a slash "/" and a backslash "\" are detected from the shaped scan image (step 605). On the other hand, synchronization codes which are codes for positioning a two-dimensional code are detected from the shaped scan image (step 606). The code acquisition portion 631 detects the two-dimensional code with reference to the positions of the synchronization codes (step 607).

Besides, information such as an ECC (Error Correcting Code) is derived from the two-dimensional code and is decoded (step 608). In addition, the decoded information is restored to the original information (step 609).

In the code acquisition portion 631 of the control portion 63, position information and identification information are derived from the code information restored in the above way, and the derived information items are stored in the information storage portion 633 (step 610). On the other hand, the locus calculation portion 632 calculates the locus of the pen tip from the position information stored in the information storage portion 633, and it stores the calculated locus in the information storage portion 633 (step 611). Storage information items such as the identification information and the locus information, which are stored in the information storage portion 633, are transmitted to, for example, the terminal device 700 by wire or radio (step 612).

The terminal device 700 having received these information items performs the operation of acquiring an electronic document which is managed by the document management server 300. Here, the correspondence among a medium ID which is identification information read from the sheet of paper (medium), a medium address which is position information on the medium, a document ID which is the identification information of the electronic document, a document address which is position information on the electronic document, and so forth, is managed by the identification information management server 200, so that the terminal device 700 requests the identification information management server 200 to acquire the electronic document. Incidentally, it is assumed that, on this occasion, the medium ID and the locus information (position on the medium) are contained in the request for the acquisition of the electronic document, thereby to make also a request for superposing the character or the like recorded with the pen device 600, on the position of the electronic document corresponding to the locus on the medium.

In the identification information management server 200, the reception unit 20a receives the acquisition request and delivers the medium ID and the position on the medium, to the correspondent information management unit 21.

Figure 11:
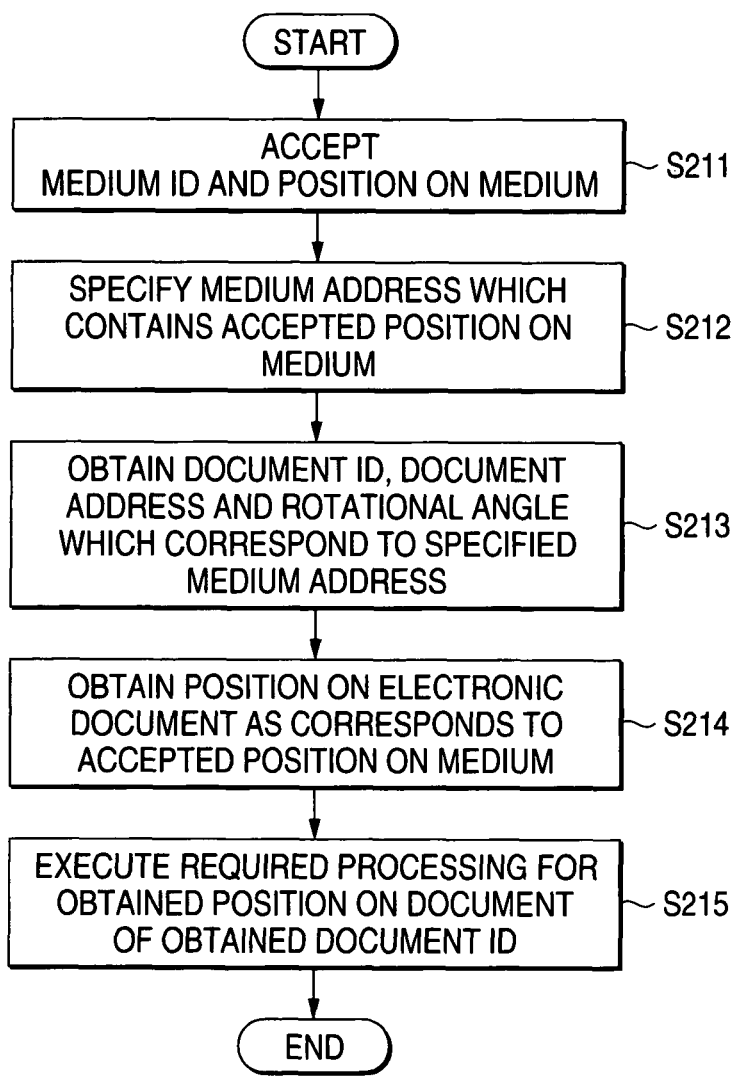
FIG. 11 is a flow chart showing an operation in the case where the identification information management server in the first embodiment of the invention utilizes the correspondent information.

Thus, the correspondent information management unit 21 executes a process as shown in FIG. 11.

First, the management unit 21 accepts the medium ID and the position on the medium, from the reception unit 20a (step 211). Besides, the management unit 21 refers to the correspondent information DB 22 so as to specify a medium address which contains the accepted position on the medium, among medium addresses which correspond to the accepted medium ID (step 212). In addition, it obtains the medium ID, document address and rotational angle which correspond to the specified medium address (step 213).

Subsequently, the correspondent information management unit 21 obtains the position on the electronic document as corresponds to the accepted position on the medium (step 214). As stated before, in this embodiment, the corresponding relationship between the region on the electronic document and the region on the medium is defined by the coordinates of the left upper points of the respective regions as well as those of the right lower points thereof and the rotational angle, in the correspondent information DB 22. Accordingly, that position within a corresponding region on the medium at which an image at a position lying within a predetermined region on the electronic document is printed can be obtained by a comparatively simple computation.

Besides, the position in the electronic document of the obtained document ID as has been thus obtained is subjected to required processing (step 215). Here, the character or the like depicted with the pen device 600 is superposed. However, the required processing may be any, and it may well be, for example, the processing of accessing the data of a link destination described at a position indicated on the medium.

Then, the operation of the first embodiment is ended.

Incidentally, this embodiment has been described on the case where the N-up and the scale-up or -down have been designated as the layout information. This embodiment, however, can also be applied to a case where only one of the scale-up or -down, the rotation and the arrangement position has been designated (the N-up is the combination of these conditions).

The case of designating only the scale-up or -down includes, for example, a case where an electronic document created with the A4-size is printed on a medium of the B5-size. Besides, the case of designating only the rotation includes, for example, a case where, when coordinate information is normalized in the vertically longer direction of the A4-size, an electronic document created with the normalized size and in the direction is printed on a laterally longer medium of the same size. Further, the case of designating only the arrangement position includes, for example, a case where a part of an electronic document as patched on a screen is printed.

As described above, in this embodiment, an electronic document is printed on a medium on the basis of designated layout information, and in that case, the corresponding relationship between a position on the electronic document and a position on the medium is created and managed on the basis of the layout information. Thus, even when the electronic document is outputted to the medium in a free layout, the correlation of the positions can be attained between the medium and the electronic document.

Second Embodiment

Figure 12:
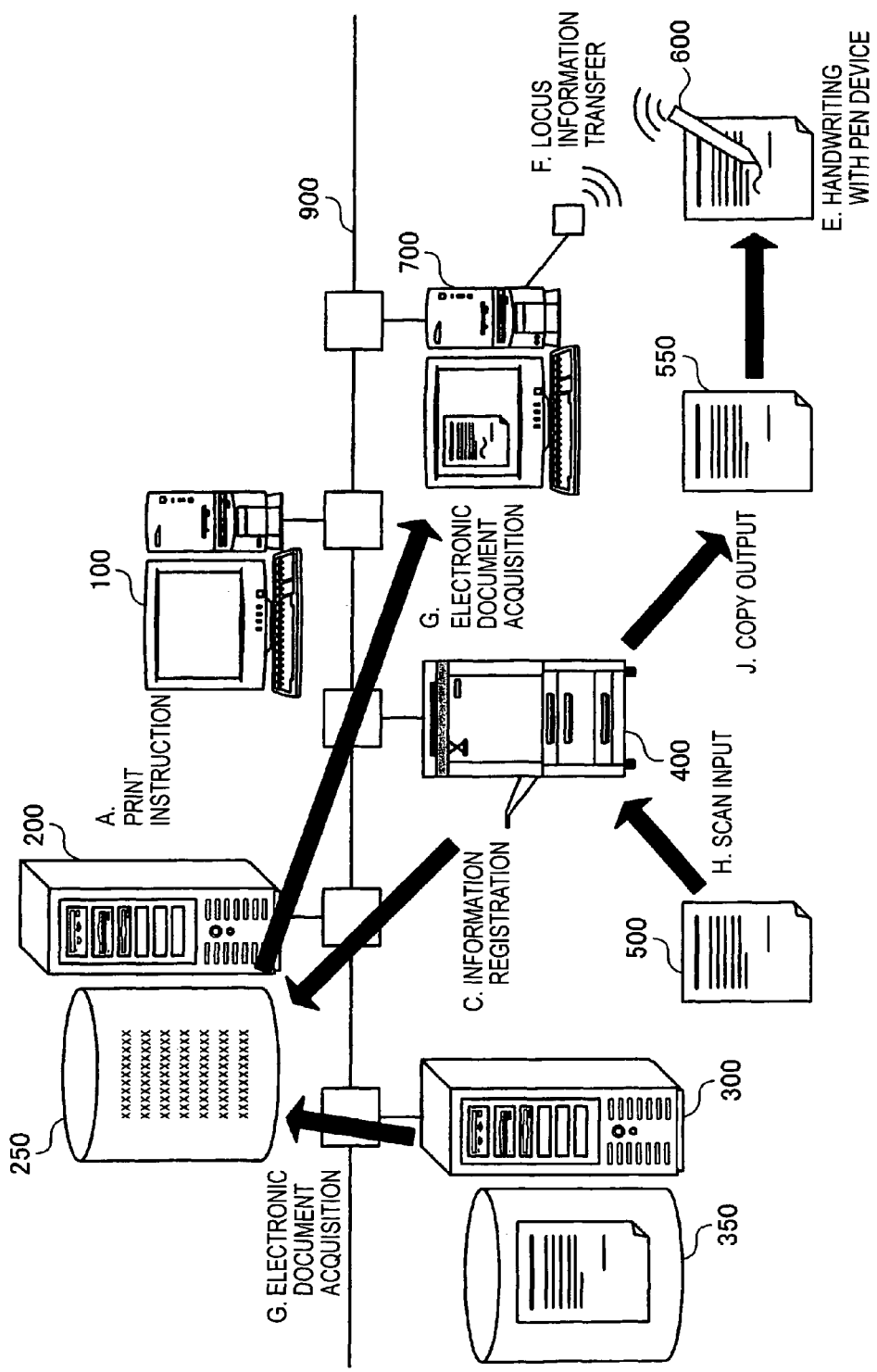
FIG. 12 is a diagram showing the general configuration of a system to which a second embodiment of the invention is applied.

FIG. 12 shows an example of the configuration of a system to which the second embodiment of the invention is applied. Constituents included in the system are substantially the same as in the first embodiment. Different from the first embodiment is the point that an item of printed matter 500 is copied by an image forming apparatus 400 so as to generate a duplicate 550, and that handwriting with a pen device 600 is done onto the duplicate 550.

The operation of the system will be outlined below.

First, it is premised that, as stated in the first embodiment, an identification information management server 200 having received a print instruction for an electronic document, from a terminal device 100, transmits an image output instruction for the electronic document, to the image forming apparatus 400, in which the item of printed matter 500 is printed. As in the first embodiment, the printed matter 500 is formed with a code image affixed by the identification information management server 200, as an invisible image by using an invisible toner, and it is formed with the other image (the image of apart contained in the original electronic document), as a visible image by using a visible toner.

It is assumed that the printed matter 500 thus outputted is thereafter scan-inputted to the image forming apparatus 400 (H). In that case, the image forming apparatus 400 transmits to the identification information management server 200, the correspondence among a medium ID (hereinbelow, termed "new medium ID") which the apparatus 400 itself has issued in order to uniquely identify the duplicate 550, position information (hereinbelow, termed "new medium address") which is to be embedded into the duplicate 550, a medium ID (hereinbelow, termed "old medium ID") and position information (hereinbelow, termed "old medium address") which have been read from the printed matter 500, and so forth (I). When the image output instruction has been responsively sent from the identification information management server 200, the image forming apparatus 400 outputs the duplicate 550 (J).

On the other hand, a user is assumed to have recorded (handwritten) a character or pattern on the duplicate 550 by employing the pen device 600 (E). Thus, the imaging element of the pen device 600 grasps a certain region on the duplicate 550 so as to obtain position information and identification information. Besides, the locus information of the character or pattern as obtained on the basis of the position information is transmitted to a terminal device 700 by radio or wire, together with the identification information (F). By the way, in the system, the invisible image is formed by employing the invisible toner whose absorption factor for infrared radiation is higher than a prescribed reference, whereby the invisible image can be read by the pen device 600 which is capable of projecting and sensing the infrared radiation.

Thereafter, the terminal device 700 transmits the identification information to the identification information management server 200, thereby to make a request for the transmission of the electronic document corresponding to this identification information. Upon receiving the request, the identification information management server 200 acquires the electronic document corresponding to the identification information, from a document management server 300, and it transmits the acquired electronic document to the terminal device 700 (G). As a result, the electronic document sent from the identification information management server 200 and the locus information sent from the pen device 600 are combined in the terminal device 700, and the combined information is displayed thereon.

Such a configuration, however, is a mere example to the last. By way of example, a single server may well be endowed with the function of the identification information management server 200 and that of the document management server 300. Besides, the function of the identification information management server 200 may well be incarnated by the image processing section of the image forming apparatus 400. Further, the terminal devices 100 and 700 may well be configured as an identical terminal device.

Now, the configuration and operation of the system will be described in more detail.

Figure 13:
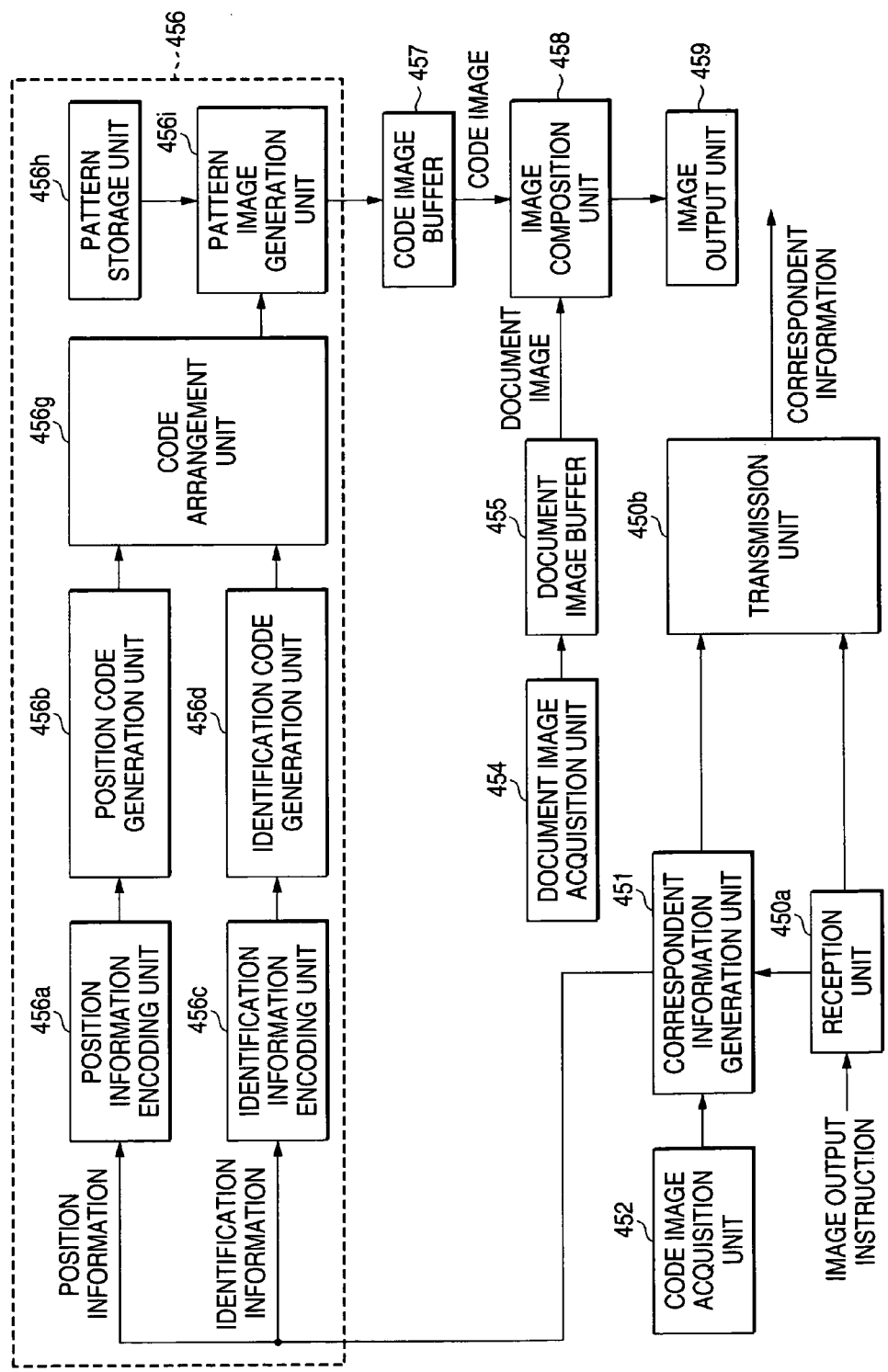
FIG. 13 is a block diagram showing the functional configuration of the image processing section of an image forming apparatus in the second embodiment of the invention.

FIG. 13 is a diagram showing an example of the configuration of the image processing section of the image forming apparatus 400.

The image processing section of the image forming apparatus 400 includes a reception unit 450a, a correspondent information generation unit 451, a code image acquisition unit 452, a document image acquisition unit 454, a document image buffer 455, a code image generation section 456, a code image buffer 457, an image composition unit 458, an image output unit 459, and a transmission unit 450b.

Besides, the code image generation section 456 includes a position information encoding unit 456a, a position code generation unit 456b, an identification information encoding unit 456c, an identification code generation unit 456d, a code arrangement unit 456g, a pattern storage unit 456h, and a pattern image generation unit 456i.

The reception unit 450a receives from the network 900, an image formation instruction which is transmitted after the updating of a correspondent information DB 22 in the identification information management server 200 has been completed, and so forth.

The correspondent information generation unit 451 generates the information items of the correspondences between the identification information and position information on the printed matter 500 and the identification information and position information on the duplicate 550. Incidentally, the correspondent information generation unit 451 can also be grasped as an information generation unit from the viewpoint of generating the information items which are to be registered.

The code image acquisition unit 452 reads the code image printed on the printed matter 500, by projecting infrared radiation by way of example.

The document image acquisition unit 454 reads the code image printed on the printed matter 500, by the function of an existing scanner, so as to store the read code image in the document image buffer 455.

The code image generation section 456 generates the code image on the basis of the information items generated by the correspondent information generation unit 451, and it stores the generated image in the code image buffer 457. Incidentally, since a detailed functional configuration within the code image generation section 456 is the same as described in the first embodiment, it shall be omitted from detailed description here.

The image composition unit 458 composites the document image stored in the document image buffer 455, and the code image stored in the code image buffer 457.

The image output unit 459 outputs an image after the composition by the image composition unit 458, to the body of the image forming apparatus 400 (the mechanism shown in FIG. 7).

The transmission unit 450b transmits the correspondent information generated by the correspondent information generation unit 451, to the identification information management server 200.

Incidentally, these functional parts are incarnated by the cooperation between software and hardware resources. Concretely, the unshown CPU of the image processing section of the image forming apparatus 400 loads programs which incarnate the respective functions of the reception unit 450a, correspondent information generation unit 451, code image acquisition unit 452, document image acquisition unit 454, code image generation section 456, image composition unit 458, image output unit 459 and transmission unit 450b, from an external storage device into a main storage device, and it executes processes.

Next, there will be described the operation of the image processing section of the image forming apparatus 400 in the case where the printed matter 500 is scanned so as to obtain the duplicate 550. Incidentally, it is assumed here that; the printed matter 500 is not directly copied, but that as shown in FIGS. 14A and 14B, a medium created by patching several regions from, for example, a plurality of items of printed matter 500 is copied so as to obtain the duplicate 550.

Figure 14A:
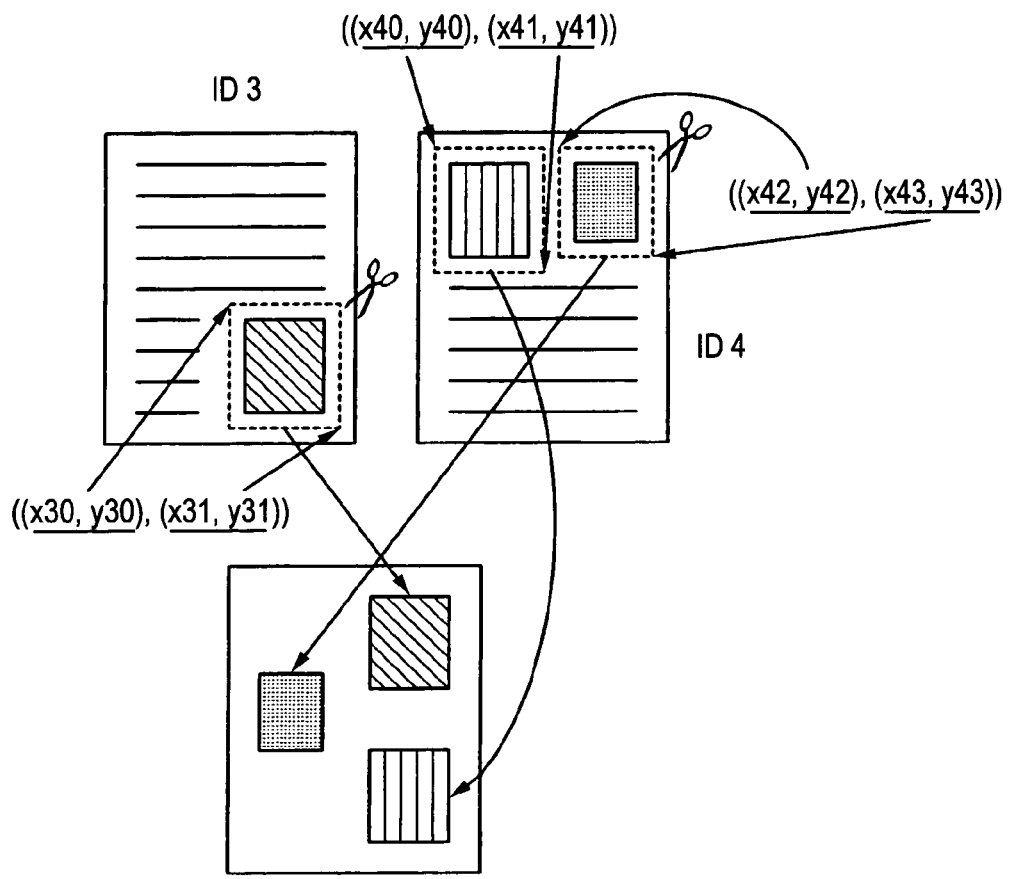
FIGS. 14A and 14B are diagrams showing an example of copying in the second embodiment of the invention.
Figure 14B:
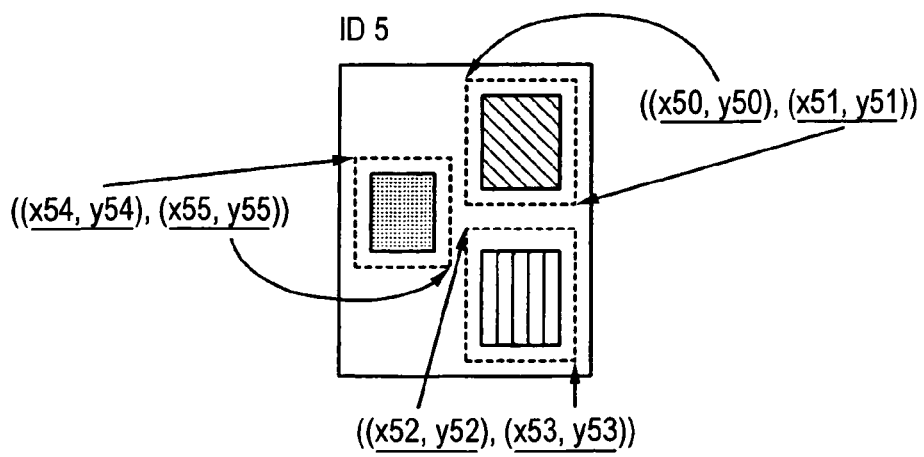

More specifically, as shown in FIG. 14A, a region ((x30, y30), (x31, y31)) is clipped from a medium of medium ID "ID3" and is pasted on the right upper part of the medium for use in the copying. Besides, a region ((x40, y40), (x41, y41)) is clipped from a medium of medium ID "ID4" and is pasted on the right lower part of the medium for use in the copying, and also a region ((x42, y42), (x43, y43)) is clipped and is pasted on the left middle part of the medium for use in the copying. In addition, the medium is copied, whereby the addresses of the patched parts in the duplicate 550 are determined. Concretely, as shown in FIG. 14B, the right upper part becomes a region ((x50, y50), (x51, y51)), the right lower part becomes a region ((x52, y52), (x53, y53)), and the left middle part becomes a region ((x54, y54), (x55, y55)).

Besides, in this embodiment, a scanner unit which is the image reading unit of the image forming apparatus 400 is assumed to include, not only an ordinary mechanism for reading the visible image, but also a mechanism for reading the invisible code image through the projection of, for example, infrared radiation.

In the image processing section of the image forming apparatus 400, first of all, the code image acquisition unit 452 acquires the code image read by the scanner unit, and the document image acquisition unit 454 acquires the document image read by the scanner unit of the images, the code image acquired by the code image acquisition unit 452 is delivered to the correspondent information generation unit 451.

Thus, the correspondent information generation unit 451 executes a process as shown in FIG. 15.

First, the correspondent information generation unit 451 accepts from the code image acquisition unit 452, the old medium ID which is the identification information of the printed matter 500, and the old medium address which is the position information of the printed matter 500 (step 461).

Subsequently, the correspondent information generation unit 451 issues the new medium ID which is the identification information of the duplicate 550 (step 462). By the way, in this case, it is considered that the new medium ID is generated by combining, for example, the identification information and printout time of the image forming apparatus 400.

Besides, the correspondent information generation unit 451 acquires the new medium address which is position information that is to be embedded in the duplicate 550 (step 463). By the way, in this case, an address which is prepared in accordance with the size and sense of the duplicate 550 beforehand is acquired as the new medium address.

Thereafter, the correspondent information generation unit 451 generates the correspondent information items among the old medium ID of the printed matter 500, the old medium address of the printed matter 500, the rotational angle in the case where the duplicate 550 is obtained by copying the printed matter 500, the new medium ID of the duplicate 550, and the new medium address concerning the region which corresponds to the old medium address in the duplicate 550 (step 464).

Shown in FIG. 16A is an example of the correspondent information items which are thus generated.

FIG. 16A exemplifies the correspondent information items which are generated in the case of the patching and copying shown in FIGS. 14A and 14B. More specifically, the correspondent information items indicate that the region ((x30, y30), (x31, y31)) on the medium of the medium ID "ID3" is arranged in the region ((x50, y50), (x51, y51)) on the medium of the medium ID "ID5". Besides, they indicate that the region ((x40, y40), (x41, y41)) and the region ((x42, y42), (x43, y43)) on the medium of the medium ID "ID4" are respectively arranged in the region ((x52, y52), (x53, y53)) and the region ((x54, y54), (x55, y55)) on the medium of the medium ID "ID5". By the way, in the case of the example in FIGS. 14A and 14B, the patching is done without any rotation, and hence, "0" is recorded as the rotational angle.

Referring back to FIG. 15, the correspondent information generation unit 451 transmits the generated correspondent information items to the identification information management server 200 (step 465). Thus, in the identification information management server 200, the correspondent information DB 22 is updated. Concretely, the correspondences among the old medium ID and old medium address, the document ID and document address of the electronic document which is the source of the document image printed on the printed matter 500, and the rotational angle in the case where the electronic-document is printed on the printed matter 500, are managed in the correspondent information DB 22. In the correspondent information DB 22, accordingly, the new medium ID is set as the medium ID, the new medium address is set as the medium address, the document ID corresponding to the old medium ID is set as the document ID, the document address corresponding to the old medium address is set as the document address, and the above rotational angle is set as the rotational angle.

Shown in FIG. 16B are the contents of the correspondent information DB 22 on this occasion.

FIG. 16B exemplifies the information items which are registered in the case of the patching and copying shown in FIGS. 14A and 14I. More specifically, the information items indicate that the region ((x30, y30), (x31, y31)) of the first page of the electronic document of the document ID "Doc3" is printed in the region ((x50, y50), (x51, y51)) on the medium of the medium ID "ID5". Besides, they indicate that the region ((x40, y40), (x41, y41)) and the region ((x42, y42), (x43, y43)) of the first page of the electronic document of the document ID "Doc4" are respectively printed in the region ((x52, y52), (x53, y53)) and the region ((x54, y54), (x55, y55)) on the same medium.

When the information items have been registered in the correspondent information DB 22 in this manner, a signal indicating to that effect is sent from the identification information management server 200 to the image forming apparatus 400, whereupon the image forming apparatus 400 generates the duplicate 550.

Concretely, the correspondent information generation unit 451 outputs the information items necessary for code generation (medium ID and medium address), to the code image generation unit 456.

Thus, the medium address is encoded in the position information encoding unit 456a, and a position code indicative of the encoded medium address is generated in the position code generation unit 456b. Besides, the medium ID is encoded in the identification information encoding unit 456c, and an identification code indicative of the encoded medium ID is generated in the identification code generation unit 456d.

In addition, a two-dimensional code array corresponding to an output image size is generated by the code arrangement unit 456g, and a pattern image corresponding to the two-dimensional code array is generated by the pattern image generation unit 456i.

Lastly, the document image acquired by the document image acquisition unit 454 and the code image generated by the code image generation section 456 before are composited in the image composition unit 458, and the resulting image is delivered to the image output unit 459. Thus, the image output unit 459 outputs the composited image to the body (mechanism in FIG. 7) of the image forming apparatus 400.

In compliance with the image output instruction, the image forming apparatus 400 prints onto the medium the composited image of the document image of the electronic document to be printed and the code image, so that the user obtains the duplicate 550.

Incidentally, since the configuration and operation of the print mechanism of the image forming apparatus 400 have been described in the first embodiment, they shall be omitted from detailed description here. Besides, the code image which is printed in this embodiment, the configuration and operation of the pen device 600 which reads the code image, and that operation of the identification information management server 200 which is based on the medium ID and the position on the medium as have been read from the code image, are the same as in the first embodiment, so that they shall be omitted from description.

Then, the operation of the second embodiment is ended.

Incidentally, this embodiment has been described on the case where the duplicate 550 is obtained by patching and copying the items of printed matter 500. This embodiment, however, can also be applied to a case where copying is done in accordance with layout information items such as scale-up or -down, rotation and arrangement position (the patching is the special aspect of the arrangement position).

As described above, in this embodiment, an electronic document printed on a first medium is copied onto a second medium on the basis of designated layout information, and in that case, the corresponding relationship between a position on the electronic document and a position on the second medium is generated and managed on the basis of the layout information. Thus, even when the medium in which the electronic document is arranged in a free layout is copied onto the different medium, the correlation of the positions can be attained between the different medium and the electronic document.

According to an embodiment of the present invention, information on a print layout (hereinbelow, termed "layout information") and position information when printing an electronic document in accordance with predetermined settings (ordinary settings) are normalized, and the correspondences of the layout information and the position information with layout information and position information when printing the electronic document in accordance with actual print conditions are managed. That is, the position information management system of the invention comprises a document acquisition unit which acquires an electronic document to be printed; a layout acquisition unit which acquires layout information when the electronic document is printed on a medium in a layout different from a layout for ordinary printing; and an information generation unit which generates correspondent information between a position on the electronic document and a position on the medium when the electronic document is printed on the medium on the basis of the layout information.

Besides, the embodiment of the invention may be grasped as a system that utilizes the correspondent information thus generated. In that case, the position information management system of the invention comprises a storage unit which stores therein correspondent information between a position on an electronic document and a position on a medium when the electronic document is printed on the medium in accordance with a layout different from a layout for ordinary printing; a position accepting unit which accepts designation of the position on the medium; and a position specifying unit which specifies the position on the electronic document as corresponds to the designated position on the medium, with reference to the correspondent information.

Further, in the embodiment of the invention, in case of, for example, copying a medium which has been created by patching media to which electronic documents have been outputted in a state where location information items in the electronic documents can be specified, the source electronic documents and their location information items and location information items on the copied medium can be associated and managed. In that case, the image forming apparatus of the invention comprises an accepting unit which accepts a copying instruction for a first medium formed with an image of an electronic document; an image reading unit which reads the image of the electronic document from the first medium in compliance with the copying instruction; a layout acquisition unit which acquires layout information when the image of the electronic document is formed on a second medium in a layout different from a layout for ordinary formation; a print unit which forms the image of the electronic document on the second medium on the basis of the layout information; and an information generation unit which generates information necessary for management of correspondence between a position on the electronic document and a position on the second medium printed with the image at the former position.

Further, the embodiment of the invention may be grasped as a method of managing position information. In that case, the position information management method of the invention includes the steps of acquiring a document image which is to be printed on a medium; forming the document image on the medium in accordance with a layout different from a layout for ordinary printing; and storing correspondent information between a position on an electronic document which is a source of the document image and a position on the medium which is formed with the image of the former position.

On the other hand, the embodiment of the invention may also be grasped as a program for causing a computer to incarnate predetermined functions. In that case, the program of the invention causes a computer to incarnate a function of acquiring an electronic document to be printed; a function of acquiring layout information when the electronic document is printed on a medium in a layout different from a layout for ordinary printing; and a function of generating correspondent information between a position on the electronic document and a position on the medium when the electronic document is printed on the medium on the basis of the layout information.

The entire disclosure of Japanese Patent Application No. 2005-203452 filed on Jul. 12, 2005 including specification, claims, drawings and abstract is incorporated herein by reference in its entirety.

What is claimed is:

1. A position information management system, comprising:
 a document acquisition unit that acquires an electronic document to be printed, the electronic document comprising a first page of the electronic document and a second page of the electronic document;
 a layout acquisition unit that acquires layout information that indicates an n-up arrangement in which the first page of the electronic document is to be printed on a single page of medium and the second page of the electronic document is to be printed on the single page of medium;
 an information generation unit that generates correspondent information comprising a first coordinate position on the single page of medium at which the first page of the electronic document is to be printed and a second coordinate position on the single page of medium at which the second page of the electronic document is to be printed, on the basis of the n-up arrangement of the first page of the electronic document and the second page of the electronic document on the single page of medium indicated by layout information; and
 a management unit that receives from a pen device a request to modify the electronic document, the request comprising a position of the pen device on the single page of medium having the first page of the electronic document and the second page of the electronic document printed thereon at which an annotation is added to the single page of medium, the annotation comprising a character or a pattern recorded on the single page of medium by the pen device, determines a position on one of the first page of the electronic document and the second page of the electronic document at which the annotation is added based on the position on the single page of medium and the correspondent information, and modifies the electronic document to include the annotation at the position on the one of the first page of the electronic document and the second page of the electronic document.

2. The position information management system as defined in claim 1, further comprising an image generation unit that generates an image by superposing a document image of the first page of the electronic document, the second page of the electronic document, and a code image indicating the first position and the second position on the medium.

3. The position information management system as defined in claim 1, further comprising a storage unit that stores the first coordinate position in association with the first page of the electronic document and the second coordinate position in association with the second page of the electronic document.

4. The position information management system as defined in claim 1, wherein the layout information indicates a number of pages of the electronic document to be printed on the single page of medium.

5. The position information management system as defined in claim 1, wherein the layout information is an angle of rotation to which the first page of the electronic document and the second page of the electronic document are subjected when the electronic document is printed on the single page of medium.

6. A position information management system, comprising:
   a storage unit which stores therein correspondent information comprising a first coordinate position on a single page of medium at which a first page of an electronic document is to be printed and a second coordinate position on the single page of medium at which a second page of the electronic document is to be printed, in accordance with a specific layout that indicates an n-up arrangement in which the first page of the electronic document is to be printed on the single page of medium and the second page of the electronic document is to be printed on the single page of medium;
   a position accepting unit that accepts from the pen device an input of a position of the pen device on the single page of medium having the first page of the electronic document and the second page of the electronic document printed thereon at which an annotation is added to the single page of medium, the annotation comprising a character or a pattern recorded on the single page of medium by the pen device; and
   a position specifying unit that specifies one of a first position within the first page of the electronic document and a second position within the second page of the electronic document corresponding to the input position by referring to the correspondent information.

7. The position information management system as defined in claim 6, wherein the position accepting unit accepts the input of the position obtained by reading a code image printed on the single page of medium.

8. The position information management system as defined in claim 6, further comprising a processing unit that modifies the electronic document to include the annotation at the one of the first position within the first page of the electronic document and the second position within the second page of the electronic document specified by the position specifying unit.

9. An image forming apparatus, comprising: an accepting unit that accepts a copying instruction to copy a first medium, the first medium comprising a first page of the first medium having printed thereon an image of a first page of an electronic document and a second page of the first medium having printed thereon an image of a second page of the electronic document;
   an image reading unit that reads the image of the first page of the electronic document and the second page of the electronic document from the first page and the second page of the first medium in compliance with the copying instruction;
   a layout acquisition unit that acquires layout information when the image of the first page of the electronic document and the image of a second page of the electronic document are to be formed on a second medium, the layout information indicating an n-up arrangement in which the first page of the electronic document is to be printed on a single page of the second medium and the second page of the electronic document is to be printed on the single page of the second medium;
   a print unit that forms the image of the first page of the electronic document and the image of the second page of the electronic document on the single page of the second medium in the n-up arrangement on the basis of the layout information;
   an information generation unit that generates correspondent information comprising a first coordinate position on the second medium at which the image of the first page of the electronic document is to be printed and a second coordinate position on the second medium at which the image of the second page of the electronic document is to be printed, on the basis of the n-up arrangement of the first page of the electronic document and the second page of the electronic document on the single page of medium indicated by layout information; and
   a management unit that receives a request from a pen device to modify the electronic document, the request comprising a position of the pen device on the single page of the second medium having the first page of the electronic document and the second page of the electronic document printed thereon at which an annotation is added to the single page of the second medium, the annotation comprising a character or a pattern recorded on the single page of medium by the pen device, determines a position on one of the first page of the electronic document and the second page of the electronic document at which the annotation is added based on the position on the single page of the second medium and the correspondent information, and modifies the electronic document to include the annotation at the position on the one of the first page of the electronic document and the second page of the electronic document.

10. The image forming apparatus as defined in claim 9, wherein the print unit forms a code image indicating the first position and the second position on the single page of the second medium.

11. The image forming apparatus as defined in claim 9, wherein the layout information indicates a number of pages of the electronic document to be printed on the single page of the second medium.

12. The image forming apparatus as defined in claim 9, wherein the layout information is an angle of rotation to which the image of the first page of the electronic document is subjected when the image of the first page of the electronic document is formed on the single page of the second medium.

13. A position information management method, comprising:

acquiring a document image of a document to be printed on a single page of medium, the document comprising a first page of the document and a second page of the document;

forming the document image on the single page of medium in accordance with a specific layout that indicates an n-up arrangement in which the first page of the document is to be printed on the single page of medium and the second page of the document is to be printed on the single page of medium;

storing correspondent information comprising a first coordinate position on the single page of medium at which the first page of the document is to be printed and a second coordinate position on the single page of medium at which the second page of the document is to be printed, on the basis of the n-up arrangement of the first page of the document and the second page of the document on the single page of medium indicated by layout;

receiving a request from the pen device to modify the electronic document, the request comprising a position of the pen device on the single page of medium having the first page of the document and the second page of the document printed thereon at which an annotation is added to the single page of medium the annotation comprising a character or a pattern recorded on the single page of medium by the pen device;

determining a position on one of the first page of the document and the second page of the document at which the annotation is added based on the position on the single page of medium and the correspondent information; and modifying the document image to include the annotation at the position on the one of the first page of the document and the second page of the document.

14. The position information management method as defined in claim 13, wherein the document is an electronic document.

15. The position information management method as defined in claim 13, wherein the document is formed on a physical medium.

16. A non-transitory computer-readable medium having embodied thereon a program of instructions executable by a computer to perform an electronic document modification method comprising the steps of:

acquiring an electronic document to be printed, the electronic document comprising a first page of the electronic document and a second page of the electronic document;

acquiring layout information that indicates an n-up arrangement in which the first page of the electronic document is to be printed on a single page of medium and the second page of the electronic document is to be printed on the single page of medium;

generating correspondent information comprising a first coordinate position on the single page of medium at which the first page of the electronic document is to be printed and a second coordinate position on the single page of medium at which the second page of the electronic document is to be printed, on the basis of the n-up arrangement of the first page of the electronic document and the second page of the electronic document on the single page of medium indicated by layout information;

receiving a request from the pen device to modify the electronic document, the request comprising a position of the pen device on the single page of medium having the first page of the electronic document and the second page of the electronic document printed thereon at which an annotation is added to the single page of medium, the annotation comprising a character or a pattern recorded on the single page of medium by the pen device;

determining a position on one of the first page of the electronic document and the second page of the electronic document at which the annotation is added based on the position on the single page of medium and the correspondent information; and modifying the electronic document to include the annotation at the position on the one of the first page of the electronic document and the second page of the electronic document.

* * * * *